(12) United States Patent
Kashihara et al.

(10) Patent No.: US 7,116,032 B2
(45) Date of Patent: Oct. 3, 2006

(54) AUTOMOTIVE ALTERNATOR AND AUTOMOTIVE ALTERNATOR BRUSH ABRASION DETECTION SYSTEM

(75) Inventors: Toshiaki Kashihara, Tokyo (JP); Katsuhiro Sasaki, Tokyo (JP); Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/049,640

(22) Filed: Feb. 4, 2005

(65) Prior Publication Data

US 2005/0127777 A1 Jun. 16, 2005

Related U.S. Application Data

(63) Continuation of application No. 10/315,180, filed on Dec. 10, 2002, now abandoned.

(30) Foreign Application Priority Data

Dec. 11, 2001 (JP) .............................. 2001-376917

(51) Int. Cl. *H01R 39/38* (2006.01)
(52) U.S. Cl. .................... 310/242; 310/239; 310/245; 310/247
(58) Field of Classification Search ........ 310/238–249; 322/25–28; 290/5
See application file for complete search history.

(56) References Cited

U.S. PATENT DOCUMENTS

| 1,034,408 | A | 8/1912 | Barnes |
|---|---|---|---|
| 2,382,799 | A | 8/1945 | Leach |
| 2,748,301 | A | 5/1956 | Spielman |
| 2,773,209 | A | 12/1956 | Kirkwood |
| 2,813,208 | A | 11/1957 | Ritter |
| 3,474,274 | A | 10/1969 | Groschopp |
| 3,480,814 | A | 11/1969 | Amrein |
| 3,538,362 | A | 11/1970 | Cheetham et al. |
| 3,603,824 | A | 9/1971 | Csaki |
| 3,609,429 | A * | 9/1971 | Thompson .................. 310/246 |
| 3,735,172 | A | 5/1973 | Battaglia |
| 5,550,418 | A | 8/1996 | Chung |
| 5,594,321 | A * | 1/1997 | Kohl et al. .................... 361/18 |
| 5,753,995 | A | 5/1998 | Ogino |

FOREIGN PATENT DOCUMENTS

| JP | 44-25046 | 10/1969 |
| JP | 57-38841 | 8/1982 |
| JP | 58-141652 | 8/1983 |

(Continued)

OTHER PUBLICATIONS

Patent Abstracts of Japanese vol. 2003, No. 7; Jul. 3, 2003.

*Primary Examiner*—Dang Le
(74) *Attorney, Agent, or Firm*—Sughrue Mion, PLLC

(57) ABSTRACT

A brush holding apparatus is mounted to an inner wall surface of a rear bracket and a cap mounted to a head portion of a brush holder portion is exposed through an opening in the rear bracket. Brushes are housed inside brush insertion apertures of the brush holder portion and are placed in elastic contact with slip rings by springs. An abrasion detection terminal is insert molded into the brush holder portion, a contact thereof projecting inside one of the brush insertion apertures and coming into contact with the corresponding spring when the brushes are abraded by a predetermined amount.

8 Claims, 15 Drawing Sheets

FOREIGN PATENT DOCUMENTS

| | | |
|---|---|---|
| JP | 63-271875 A | 11/1988 |
| JP | 64-2555 U | 1/1989 |
| JP | 03-215150 | 9/1991 |
| JP | 59-59044 | 1/1992 |
| JP | 05-038089 | 2/1993 |
| JP | 06-178600 | 6/1994 |
| JP | 3020646 | 11/1995 |
| JP | 3020647 | 11/1995 |
| JP | 09-009581 | 1/1997 |
| JP | 09-182384 | 7/1997 |
| JP | 11-164522 | 6/1999 |
| JP | 2000-083358 | 3/2000 |
| KR | 87-8275 U | 6/1987 |

* cited by examiner

AUTOMOTIVE ALTERNATOR AND AUTOMOTIVE ALTERNATOR BRUSH ABRASION DETECTION SYSTEM

CROSS REFERENCE TO RELATED APPLICATIONS

This is a continuation of U.S. application Ser. No. 10/315,180, filed Dec. 10, 2002, now abandoned the above-noted prior application is hereby incorporated by reference.

BACKGROUND OF THE INVENTION

1. Field of the Invention

The present invention relates to an automotive alternator and an automotive alternator brush abrasion detection system mounted to an automobile, etc.

2. Description of the Related Art

FIG. 23 is a longitudinal section showing a conventional automotive alternator, FIG. 24 is a perspective of a rear bracket interior portion of the conventional automotive alternator viewed from a front end, FIG. 25 is a perspective showing a brush holding apparatus used in the conventional automotive alternator, FIG. 26 is a perspective showing a rotor used in the conventional automotive alternator, and FIG. 27 is an electrical circuit diagram for an automotive vehicle mounted with the conventional automotive alternator.

In FIGS. 23 to 27, an automotive alternator 100 is constructed by rotatably mounting a Lundell-type rotor 7 by means of a shaft 6 inside a case 3 constituted by a front bracket 1 and a rear bracket 2 made of aluminum and fixing a stator 8 to an inner wall surface of the case 3 so as to cover an outer circumferential side of the rotor 7.

The shaft 6 is rotatably supported in the front bracket 1 and the rear bracket 2. A pulley 4 is fixed to a first end of this shaft 6, enabling rotational torque from an engine to be transmitted to the shaft 6 by means of a belt (not shown). A pair of slip rings 9 functioning as electric current supplying members for supplying an electric current to the rotor 7 are disposed on a second end portion of the shaft 6 so as to be separated in an axial direction and be able to rotate together with the shaft 6.

The rotor 7 is constituted by: a rotor coil 13 for generating a magnetic flux on passage of an electric current; and first and second pole cores 20 and 21 disposed so as to cover the rotor coil 13, magnetic poles being formed in the first and second pole cores 20 and 21 by the magnetic flux generated by the rotor coil 13. The first pole core 20 is made of iron, first claw-shaped magnetic poles 22 having a tapered shape being formed at a uniform angular pitch in a circumferential direction on an outer circumferential edge portion of the first pole core 20 such that the direction of taper of each of the first claw-shaped magnetic poles 22 is aligned with an axial direction. The second pole core 21 is made of iron, second claw-shaped magnetic poles 23 having a tapered shape being formed at a uniform angular pitch in a circumferential direction on an outer circumferential edge portion of the second pole core 21 such that the direction of taper of each of the second claw-shaped magnetic poles 23 is aligned with an axial direction. The first and second pole cores 20 and 21 are fixed to the shaft 6 facing each other such that the first and second claw-shaped magnetic poles 22 and 23 intermesh with each other. In addition, fans 5 are fixed to end surfaces of the first and second pole cores 20 and 21, respectively. The pair of slip rings 9 are electrically connected in series through the rotor coil 13.

The stator 8 is provided with: a cylindrical stator core 15 in which slots are disposed at a predetermined pitch in a circumferential direction; and a three-phase stator winding 16 installed in the stator core 15.

A rectifier 12 for converting alternating current generated in the stator 8 into direct current is mounted inside the case 3, the rectifier 12 being constituted by a three-phase full-wave rectifier in which three diode pairs are connected in parallel, each diode pair being composed of a positive-side diode $d_1$ and a negative-side diode $d_2$ connected in series.

A brush holding apparatus 29 is provided with a body 30 in which a brush holder portion 31, an annular shaft insertion portion 32, a circuit housing portion 33, a connector portion 34, etc., are molded integrally using an electrically-insulating resin. A conductor group is insert molded into the body 30. The conductor group constitutes wiring among the elements mounted to the body 30, projects inside the connector portion 34 to constitute external connection terminals, and exposes in required portions to constitute rectifier connection terminals 35 functioning as an electrical connection portion for connection to the rectifier 12.

Brush insertion apertures (not shown) perpendicular to a central axis of the shaft insertion portion 32 are formed in the brush holder portion 31 so as to communicate between the shaft insertion portion 32 and an external portion, a cap 31a being removably mounted to a head portion of the brush holder portion 31 so as to cover an opening at an opposite end of the brush insertion apertures from the shaft insertion portion 32. A pair of brushes 10 are housed in the brush insertion apertures of the brush holder portion 31, being forced toward the shaft insertion portion 32 by springs 11. Lead wires 14 are connected to head portions of each of the brushes 10.

A voltage regulator 18 for adjusting the magnitude of an alternating voltage generated in the stator 8 is fixed to a heat sink 17. The heat sink 17 is mounted by being fitted into the circuit housing portion 33, the voltage regulator 18 being housed inside the circuit housing portion 33.

The brush holding apparatus 29 is securely fastened to an inner wall surface of the rear bracket 2 such that the center of the shaft insertion portion 32 is aligned with a central axis of the rear bracket 2. The shaft 6 is inserted inside the shaft insertion portion 32, the pair of brushes 10 being placed in contact with the pair of slip rings 9 by the force of the springs 11. Thus, the brushes 10 slide on the slip rings 9 with the rotation of the shaft 6.

In the conventional automotive alternator 100 constructed in this manner, an electric current is supplied to the rotor coil 13 from a battery 27 constituting a power supply through the brushes 10 and the slip rings 9, generating a magnetic flux. The first claw-shaped magnetic poles 22 of the first pole core 20 are magnetized into North-seeking (N) poles by this magnetic flux, and the second claw-shaped magnetic poles 23 of the second pole core 21 are magnetized into South-seeking (S) poles. At the same time, rotational torque from the engine is transmitted to the shaft 6 by means of the belt (not shown) and the pulley 4, rotating the field rotor 7. Thus, a rotating magnetic field is imparted to the stator winding 16, generating an electromotive force in the stator winding 16. This alternating-current electromotive force passes through the rectifier 12 and is converted into direct current, the magnitude thereof is adjusted by the regulator 18, the battery is charged, and the current is supplied to an electrical load 28.

After commencement of power generation, the alternator 100 is switched to "self-excitation" by supplying a portion of the output current from the alternator 100 to the rotor coil 13 through the brushes 10.

In this conventional automotive alternator 100, because the brushes 10 are pressed against the slip rings 9 by the springs 11, they are abraded with the rotation of the shaft 6. Excessive abrasion of the brushes 10 in this manner gives rise to defective power generation, causing the internal combustion engine to stop due to insufficient electric power from the electrical system, leading to a breakdown of the automotive vehicle. Because the conventional automotive alternator 100 does not have a means for detecting abrasion of the brushes 10, one problem has been that the brushes 10 may be abraded excessively, leading to a breakdown of the automotive vehicle without the driver of the vehicle being warned in advance.

Furthermore, when power generation becomes defective in the conventional automotive alternator 100, if the automotive electrical circuit is continuously open, the battery 27 is discharged. It is possible to restart the internal combustion engine by recharging the battery 27, but once the battery 27 has been discharged, its service life deteriorates significantly, and so another problem has been that the battery 27 has had to be changed.

Brush abrasion detecting apparatuses for dynamoelectric machines, have been proposed, for example, in Japanese Utility Model No. 3020646, Japanese Utility Model No. 3020647, Japanese Patent Examined Publication No. HEI 3-15413, Japanese Patent No. 2922266, Japanese Patent Examined Publication No. SHO 57-38841, etc.

However, even if these brush abrasion detecting apparatuses are adopted in this conventional automotive alternator 100 to enable the driver of the vehicle to be informed in advance of excessive abrasion of the brushes 10, because the brush holding apparatus 29 is housed inside an airtight case 3, brush replacement is difficult, and one problem has been that time is required before recommencing operation of the vehicle.

More specifically, when the brushes 10 become abraded, first the automotive alternator 100 is removed from the internal combustion engine and taken out of the vehicle, and the brush holding apparatus 29 is extracted by dismantling the automotive alternator 100. Then the cap 31*a* is removed, the operation of replacing the brushes 10 is performed, the cap 31*a* is mounted, then the brush holding apparatus 29 is mounted to the rear bracket 2 and the automotive alternator is reassembled. Next, the automotive alternator 100 is mounted to the internal combustion engine. Thus, the brush replacement operation is extremely complicated and requires a great number of man-hours.

In recent years, reductions in internal combustion engine space have been sought with a view to ensuring maximum passenger compartment space within the framework of vehicle codes, and there is a tendency for auxiliary devices such as air discharge pipes, water pumps, etc., to be clustered close together around the automotive alternator 100, reducing the space available for the removal and replacement of the automotive alternator 100. Thus, another problem has been that removal and replacement of the automotive alternator 100 is becoming even more difficult, preventing the brushes from being replaced simply.

SUMMARY OF THE INVENTION

The present invention aims to solve the above problems and an object of the present invention is to provide an automotive alternator and an automotive alternator brush abrasion detection system enabling brush replacement to be performed simply before defective power generation or defective charging of a battery occurs by enabling a driver of a vehicle to be made aware immediately before a brush abrasion limit is reached.

With the above object in view, an automotive alternator is provided with a case, a shaft rotatably supported in the case, a rotor fixed to the shaft and disposed inside the case for generating a rotating magnetic field, a stator mounted to the case so as to cover an outer circumferential side of the rotor, a pair of electric current supplying members and a brush holding apparatus. The rotor is provided with a rotor coil in which a magnetic flux is generated on passage of an electric current and a plurality of magnetic poles magnetized by the magnetic flux generated in the rotor coil. The stator is provided with a stator winding in which an electromotive force is generated by the rotating magnetic field generated by the rotor. The pair of electric current supplying members is disposed so as to be separated in an axial direction on a first end portion of the shaft and be able to rotate together with the shaft, and is electrically connected in series by means of the rotor coil. The brush holding apparatus is disposed inside the case so as to be positioned radially outside the pair of electric current supplying members. The brush holding apparatus is provided with a brush holder portion in which a pair of brush insertion apertures is formed such that an aperture direction of each of brush insertion apertures is perpendicular to a central axis of the shaft, the pair of brush insertion apertures being separated in an axial direction of the shaft, a cap removably mounted to a head portion of the brush holder portion for covering the pair of brush insertion apertures, a pair of brushes each housed inside the pair of brush insertion apertures so as to be able to move freely in the aperture direction, a pair of brush terminals constituting input and output terminals of the brushes, a pair of lead wires each having a first end linked to a first end portion of the brushes and a second end linked to the brush terminals, electrically-conductive elastic members disposed inside each of the brush insertion apertures for placing a second end of each of the brushes in elastic contact with the electric current supplying members by forcing the brushes toward the shaft, and an abrasion detection terminal disposed in at least one of the pair of brush insertion apertures, the abrasion detection terminal being provided with a contact for contacting at least one of the elastic members when the brushes are abraded by a predetermined amount. An opening is disposed in the case radially outside the brush holder portion so as to expose the cap.

Therefore, there is provided an automotive alternator enabling brush abrasion to be detected before the occurrence of defective power generation or defective charging of the battery, and in addition, enabling brush replacement without dismantling the alternator.

With the above object in view, an automotive alternator is provided with a case, a shaft rotatably supported in the case, a rotor fixed to the shaft and disposed inside the case for generating a rotating magnetic field, a stator mounted to the case so as to cover an outer circumferential side of the rotor, a pair of electric current supplying members, and a brush holding apparatus. The rotor is provided with a rotor coil in which a magnetic flux is generated on passage of an electric current and a plurality of magnetic poles magnetized by the magnetic flux generated in the rotor coil. The stator is provided with a stator winding in which an electromotive force is generated by the rotating magnetic field generated by the rotor. The pair of electric current supplying members is disposed so as to be separated in an axial direction on a first end portion of the shaft projecting out of the case and be able to rotate together with the shaft, and is electrically connected in series by means of the rotor coil. The brush holding apparatus is removably disposed on an outer end surface of the case so as to be positioned radially outside the pair of electric current supplying members. The brush holding apparatus is provided with a brush holder portion in which a pair of brush insertion apertures is formed such that an aperture direction of each of the brush insertion apertures is perpendicular to a center axis of the shaft, the pair of brush insertion apertures being separated in an axial direction of the shaft, a cap removably mounted to a head portion of the brush holder portion for covering the pair of brush insertion apertures, a pair of brushes each housed inside the pair of brush insertion apertures so as to be able to move freely in the aperture direction, a pair of brush terminals constituting input and output terminals of the brushes, a pair of lead wires each having a first end linked to a first end portion of the brushes and a second end linked to the brush terminals, electrically-conductive elastic members disposed inside each of the brush insertion apertures for placing a second end of each of the brushes in elastic contact with the electric current supplying members by forcing the brushes toward the shaft, and an abrasion detection terminal disposed in at least one of the pair of brush insertion apertures. The abrasion detection terminal is provided with a contact for contacting at least one of the elastic members when the brushes are abraded by a predetermined amount. A cover is removably mounted to an outer wall surface of the case from an axial direction of the shaft so as to envelop the brush holding apparatus.

Therefore, there is provided an automotive alternator enabling brush abrasion to be detected before the occurrence of defective power generation or defective charging of the battery, and in addition, enabling brush replacement without dismantling the alternator.

With the above object in view, an automotive alternator brush abrasion detection system is provided with an automotive alternator and a first lamp for announcing abrasion of brushes by contact between an elastic member and a contact. The automotive alternator is provided with a case, a shaft rotatably supported in the case, a rotor fixed to the shaft and disposed inside the case for generating a rotating magnetic field, a stator mounted to the case so as to cover an outer circumferential side of the rotor, a pair of electric current supplying members, a brush holding apparatus, a rectifier disposed inside the case for rectifying and outputting the electromotive force from the stator winding, and a voltage regulator disposed inside the case for adjusting a magnitude of the electromotive force in the stator winding. The rotor being is provided with a rotor coil in which a magnetic flux is generated on passage of an electric current and a plurality of magnetic poles magnetized by the magnetic flux generated in the rotor coil. The stator is provided with a stator winding in which an electromotive force is generated by the rotating magnetic field generated by the rotor. The pair of electric current supplying members is disposed so as to be separated in an axial direction on a first end portion of the shaft and be able to rotate together with the shaft, and is electrically connected in series by means of the rotor coil. The brush holding apparatus is disposed inside the case so as to be positioned radially outside the pair of electric current supplying members. The brush holding apparatus is provided with a brush holder portion in which a pair of brush insertion apertures is formed such that an aperture direction of each of said brush insertion apertures is perpendicular to a center axis of said shaft, the pair of brush insertion apertures being separated in an axial direction of the shaft, a cap removably mounted to a head portion of the brush holder portion for covering the pair of brush insertion apertures, a pair of brushes each housed inside the pair of brush insertion apertures so as to be able to move freely in the aperture direction, a pair of brush terminals constituting input and output terminals of the brushes, a pair of lead wires each having a first end linked to a first end portion of the brushes and a second end linked to the brush terminals, electrically-conductive elastic members disposed inside each of the brush insertion apertures for placing a second end of each of the brushes in elastic contact with the electric current supplying members by forcing the brushes toward the shaft, and an abrasion detection terminal disposed in at least one of the pair of brush insertion apertures. The abrasion detection terminal is provided with a contact for contacting at least one of the elastic members when the brushes are abraded by a predetermined amount. An opening is disposed in the case radially outside the brush holder portion so as to expose the cap.

Therefore, there is provided an automotive alternator brush abrasion detection system enabling a driver to be made aware of brush abrasion by means of the first lamp and replace the brushes before the occurrence of defective power generation or defective charging of the battery, and enabling the amount of time before recommencing operation of the vehicle to be shortened by making brush replacement possible without dismantling the alternator.

With the above object in view, an automotive alternator brush abrasion detection system is provided with an automotive alternator and a first lamp for announcing abrasion of brushes by contact between an elastic member and a contact. The automotive alternator is provided with a case, a shaft rotatably supported in the case, a rotor fixed to the shaft and disposed inside the case for generating a rotating magnetic field, a stator mounted to the case so as to cover an outer circumferential side of the rotor, a pair of electric current supplying members, a brush holding apparatus, a rectifier for rectifying and outputting the electromotive force from the stator winding; and a voltage regulator for adjusting a magnitude of the electromotive force in the stator winding. The rotor is provided with a rotor coil in which a magnetic flux is generated on passage of an electric current and a plurality of magnetic poles magnetized by the magnetic flux generated in the rotor coil. The stator is provided with a stator winding in which an electromotive force is generated by the rotating magnetic field generated by the rotor. The pair of electric current supplying members is disposed so as to be separated in an axial direction on a first end portion of the shaft projecting out of the case and be able to rotate together with the shaft, and is electrically connected in series by means of the rotor coil. The brush holding apparatus is removably disposed on an outer end surface of the case so as to be positioned radially outside the pair of electric current supplying members. The brush holding apparatus is provided with a brush holder portion in which a pair of brush insertion apertures is formed such that an aperture direction of each of said brush insertion apertures is perpendicular to a center axis of said shaft, the pair of brush insertion apertures being separated in an axial direction of the shaft, a cap removably mounted to a head portion of the brush holder portion for covering the pair of brush insertion apertures, a pair of brushes each housed inside the pair of brush insertion apertures so as to be able to move freely in the aperture direction, a pair of brush terminals constituting input and output terminals of the brushes, a pair of lead wires each having a first end linked to a first end portion of the brushes and a second end linked to the brush terminals, electrically-conductive elastic members disposed inside each of the brush insertion apertures for placing a second end of each of the brushes in elastic contact with the electric current supplying members by forcing the brushes toward the shaft, and an abrasion detection terminal disposed in at least one of the pair of brush insertion apertures. The abrasion detection terminal is provided with a contact for contacting at least one of the elastic members when the brushes are abraded by a predetermined amount. A cover is removably mounted to an outer wall surface of the case from an axial direction of the shaft so as to envelop the brush holding apparatus.

Therefore, there is provided an automotive alternator brush abrasion detection system enabling a driver to be made aware of brush abrasion by means of the first lamp and replace the brushes before the occurrence of defective power generation or defective charging of the battery, and enabling the amount of time before recommencing operation of the vehicle to be shortened by making brush replacement possible without dismantling the alternator.

DETAILED DESCRIPTION OF THE PREFERRED EMBODIMENTS

Preferred embodiments of the present invention will now be explained with reference to the drawings.

Embodiment 1

Figure 1:
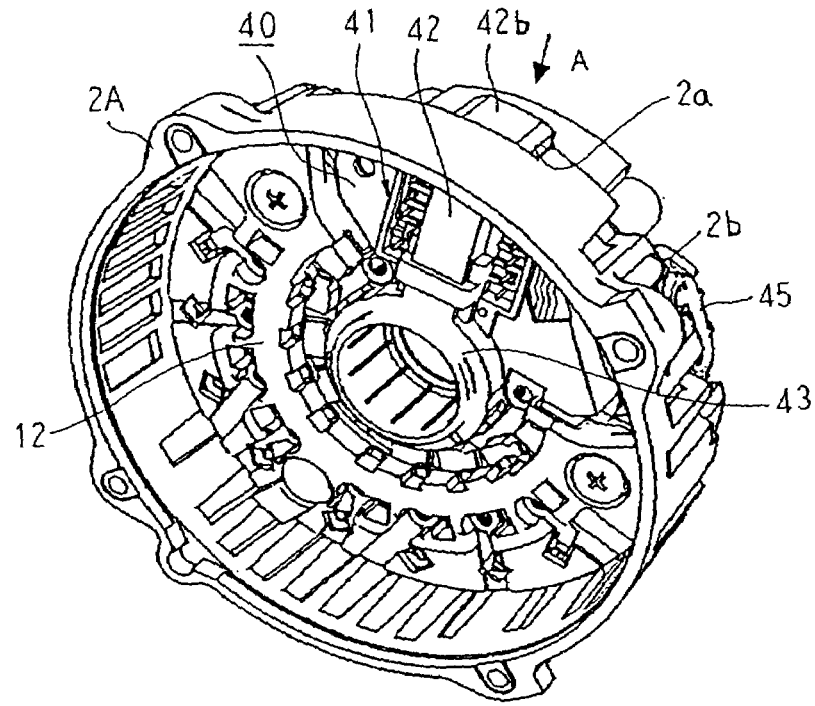
FIG. 1 is a perspective of a rear bracket interior portion of an automotive alternator according to Embodiment 1 of the present invention viewed from a front end.
Figure 2:
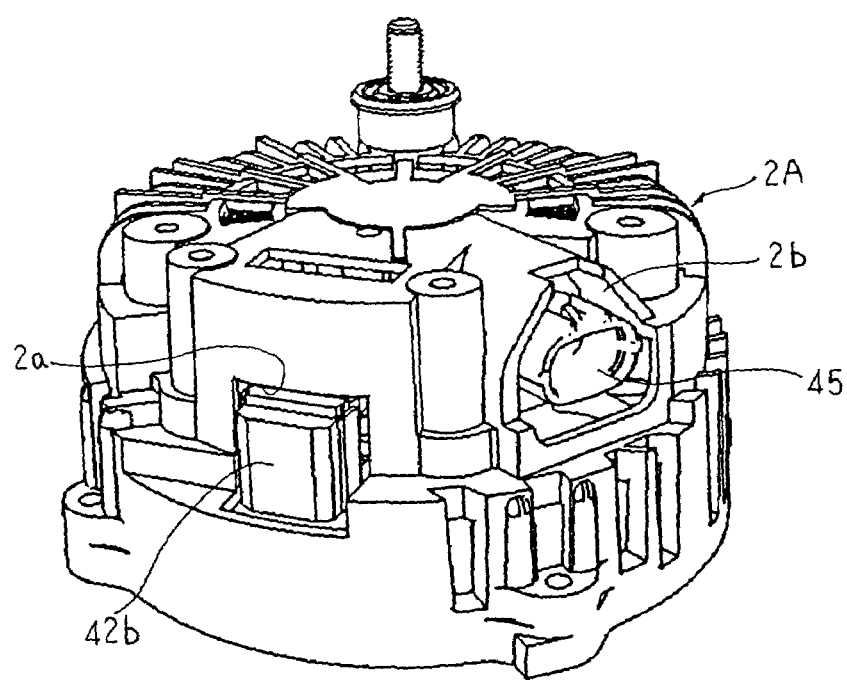
FIG. 2 is a perspective of the rear bracket shown in FIG. 1 viewed from the direction of arrow A.
Figure 3:
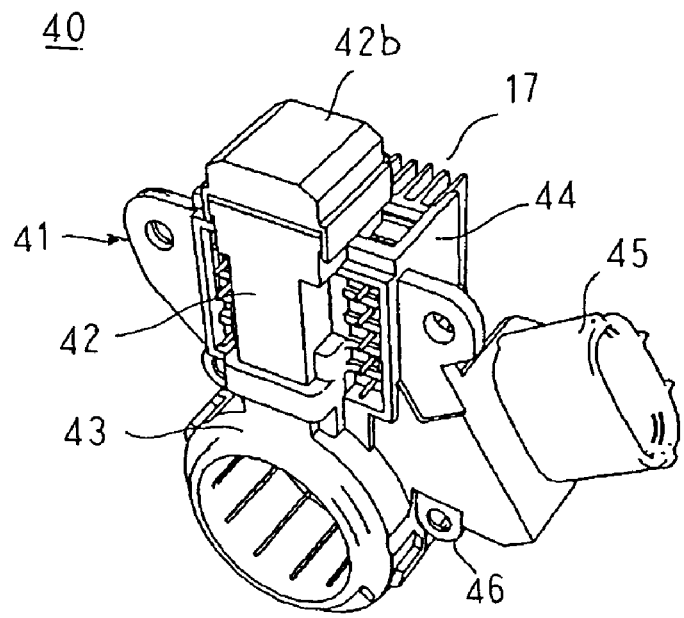
FIG. 3 is a perspective showing a brush holding apparatus used in the automotive alternator according to Embodiment 1 of the present invention.
Figure 4:
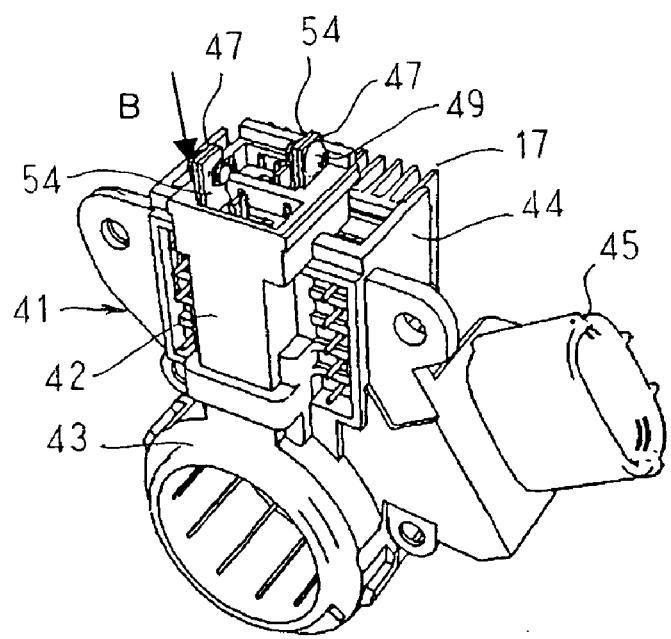
FIG. 4 is a perspective showing the brush holding apparatus shown in FIG. 3 with a cap removed.
Figure 5:
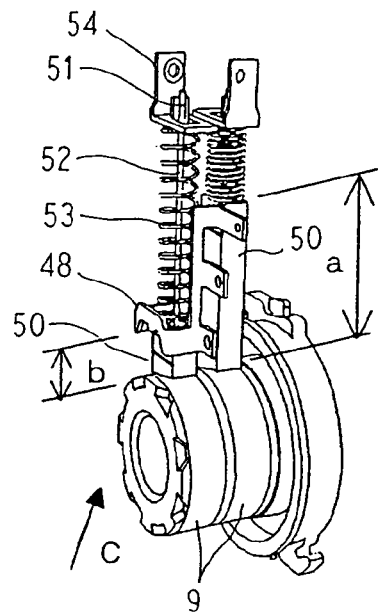
FIG. 5 is a structural diagram showing a vicinity of brushes in the automotive alternator according to Embodiment 1 of the present invention.
Figure 6:
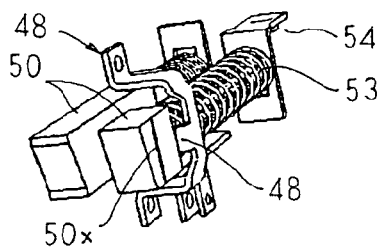
FIG. 6 is a perspective of the vicinity of the brushes shown in FIG. 5 viewed from the direction of arrow C.
Figure 7:
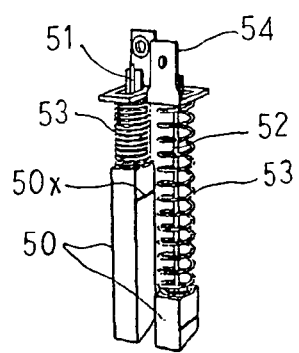
FIG. 7 is a perspective showing the vicinity of the brushes in the automotive alternator according to Embodiment 1 of the present invention.
Figure 8:
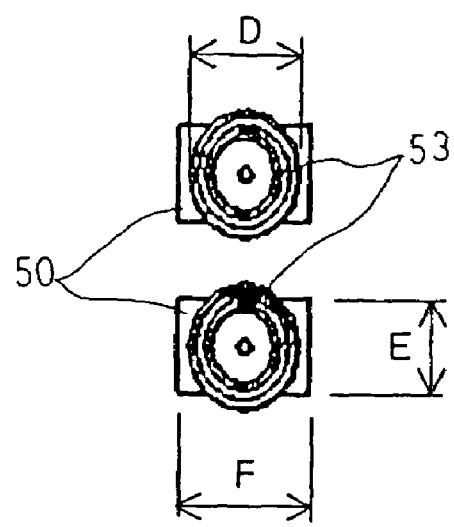
FIG. 8 is a diagram explaining a relationship between the brushes and springs in the automotive alternator according to Embodiment 1 of the present invention.
Figure 9:
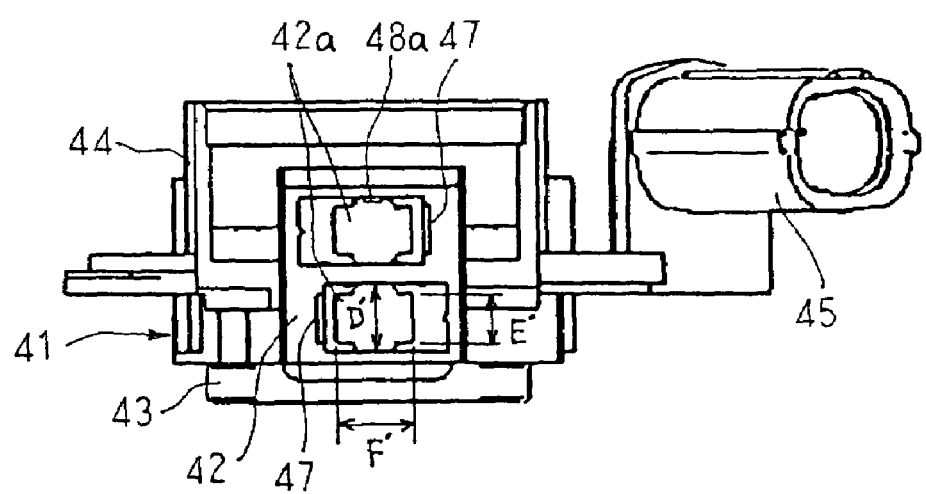
FIG. 9 is a top view of the brush holding apparatus in FIG. 4 viewed from the direction of arrow B.
Figure 10:
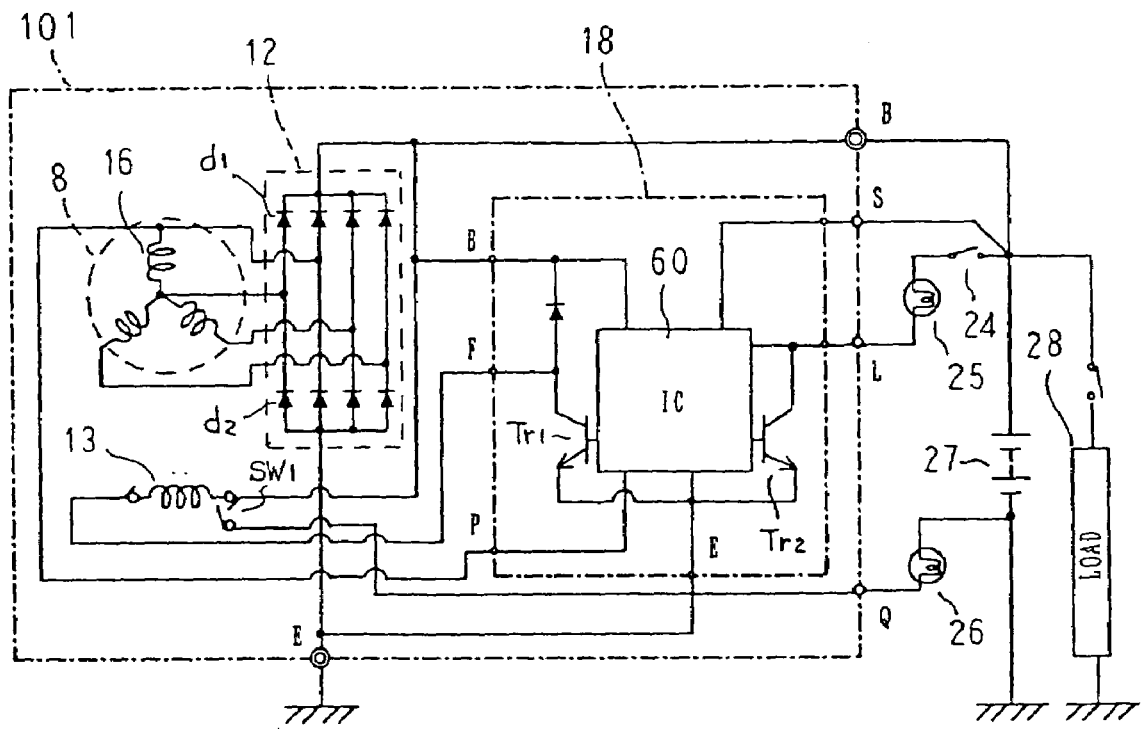
FIG. 10 is an electrical circuit diagram for an automotive vehicle mounted with the automotive alternator according to Embodiment 1 of the present invention.

FIG. 1 is a perspective of a rear bracket interior portion of an automotive alternator according to Embodiment 1 of the present invention viewed from a front end, FIG. 2 is a perspective of the rear bracket shown in FIG. 1 viewed from the direction of arrow A, FIG. 3 is a perspective showing a brush holding apparatus used in the automotive alternator according to Embodiment 1 of the present invention, FIG. 4 is a perspective showing the brush holding apparatus shown in FIG. 3 with a cap removed, FIG. 5 is a structural diagram showing a vicinity of brushes in the automotive alternator according to Embodiment 1 of the present invention, FIG. 6 is a perspective of the vicinity of the brushes shown in FIG. 5 viewed from the direction of arrow C, FIG. 7 is a perspective showing the vicinity of the brushes in the automotive alternator according to Embodiment 1 of the present invention, FIG. 8 is a diagram explaining a relationship between the brushes and springs in the automotive alternator according to Embodiment 1 of the present invention, FIG. 9 is a top view of the brush holding apparatus in FIG. 4 viewed from the direction of arrow B, and FIG. 10 is an electrical circuit diagram for an automotive vehicle mounted with the automotive alternator according to Embodiment 1 of the present invention.

Moreover, FIGS. 5 to 7 show a first brush in an abraded state, and a second brush in an unabraded state, and FIG. 9 shows the brush holding apparatus in which the brushes and the voltage regulator are not mounted.

In FIGS. 3 to 9, a brush holding apparatus 40 is provided with a body 41 in which a brush holder portion 42, an annular shaft insertion portion 43, a circuit housing portion 44, a connector portion 45, etc., are molded integrally using an electrically-insulating resin. The brush holder portion 42 is disposed so as to extend in a radial direction from an outer circumferential portion of the shaft insertion portion 43, the circuit housing portion 44 is formed on a first axial side (a rear side) of the brush holder portion 42, and the connector portion 45 is formed on a first circumferential side of the brush holder portion 42. A conductor group (not shown) is insert molded into the body 41. The conductor group constitutes wiring among the elements mounted to the body 41, projecting inside the connector portion 45 to constitute external connection terminals (a Q terminal, an L terminal, and an S terminal, for example), and exposed in required portions to constitute rectifier connection terminals 46 functioning as an electrical connection portion for connection to a rectifier 12, etc.

A pair of brush insertion apertures 42a are formed in the brush holder portion 42 so as to communicate between the shaft insertion portion 43 and an external portion, the pair of brush insertion apertures 42a being lined up in an axial direction of the shaft insertion portion 43 such that aperture centers of each are perpendicular to a central axis of the shaft insertion portion 43. A cap 42b is removably mounted to a head portion of the brush holder portion 42 so as to cover an opening at an opposite end of the brush insertion apertures 42a from the shaft insertion portion 43. The brush insertion apertures 42a are each constructed so as to have an internal shape such that the aperture shape in a cross section perpendicular to the aperture center has arc portions having a diameter D' centered on a center of a rectangular shape at central portions of first and second long sides of the rectangular shape (length of short sides: E'; length of long sides: F'). E', F', and D' are set slightly larger than E, F, and D, which are described below.

A pair of first and second holder terminals 47 are insert molded such that first ends thereof project onto opening edge portions at an opposite end of each of the brush insertion apertures 42a from the shaft insertion portion 43. In addition, an abrasion detection terminal 48 is insert molded such that a contact 48a formed with a hook shape projects inside one of the brush insertion apertures 42a from a central portion of an arc portion having the diameter D' of that brush insertion aperture 42a. A length of projection d of this contact 48a is set to $d<(D'-E')/2$, and the position of the contact 48a in a depth direction of the brush insertion aperture 42a is set such that abrasion of brushes 50 can be detected when a remaining length of the brush 50 from an abrasion limit line 50x is 2 mm, for example.

Moreover, a second end of the first holder terminal 47 is electrically connected to an output end of the rectifier 12, and a second end of the second holder terminal 47 is electrically connected to an F terminal of the voltage regulator 18. The abrasion detection terminal 48 is electrically connected to the Q terminal of the connector portion 45.

The brushes 50 are prepared by press-forming a mixture of a copper powder and graphite. The brushes 50 are formed into a substantially rectangular parallelepiped shape in which a cross section perpendicular to a longitudinal direction is a rectangular shape (length: a; length of short sides of cross section: E; length of long sides of cross section: F). An abrasion limit line 50x is applied to a side surface of each of the brushes 50. Lead wires 51 composed of soft stranded wire copper strips are fixed during the press-forming of the brushes 50 such that a first end of each lead wire 51 is embedded in a central portion of a rear end portion of the brush 50. A flexible tube 52 made of a silicone rubber, for example, is mounted to each of the lead wires 51. Springs 53 each functioning as an elastic member are constituted by cylindrical compression coil springs made of a stainless steel, a diameter D thereof being less than F and greater than E ($E<D<F$). L-shaped metal brush terminals 54 are connected by soldering or welding to second ends of the lead wires 51 passing through the inside of the springs 53. Thus, the brushes 50, the lead wires 51, the flexible tubes 52, the springs 53, and the brush terminals 54 are integrated as shown in FIG. 7 with the springs 53 disposed in a compressed state between the brushes 50 and the brush terminals 54 and the lead wires 51 held under tension by the elastic force of the springs 53.

The brushes 50 integrated with the springs 53, the brush terminals 54, etc., in this manner are inserted inside each of the brush insertion apertures 42a of the brush holder portion 42 and mounted to the brush holder portion 42 by securely fastening the brush terminals 54 to the holder terminals 47 by means of screws 49.

The voltage regulator 18 is housed inside the circuit housing portion 44 by fitting the heat sink 17 into the circuit housing portion 44 and fixing it thereto. At this time, each of the terminals of the voltage regulator 18 and the terminals of the conductor group insert-molded in the body 41 are electrically connected.

The brush holding apparatus 40 constructed in this manner, as shown in FIGS. 1 and 2, is securely fastened to an inner wall surface of a rear bracket 2A such that the central axis of the shaft insertion portion 43 is aligned with a central axis of the rear bracket 2A. At this time, aperture directions of the brush insertion apertures 42a of the brush holder portion 42 are aligned in a radial direction, the head portion of the brush holder portion 42 is exposed through an opening 2a formed in the rear bracket 2A, and the connector portion 45 is positioned inside an opening 2b formed in the rear bracket 2A.

Moreover, the automotive alternator according to Embodiment 1 is constructed in a similar manner to the conventional automotive alternator 100 except for the fact that the rear bracket 2A and the brush holding apparatus 40 are used instead of the rear bracket 2 and the brush holding apparatus 29.

In the automotive alternator constructed in this manner, the tip surfaces of the brushes 50 are placed in contact with the slip rings 9 by the elastic force of the springs 53 disposed in a compressed state between the brushes 50 and the brush terminals 54, an electric current being supplied to the rotor coil 13 through the brushes 50 and the slip rings 9. The brushes 50 slide on the slip rings 9 and are abraded by the rotation of the shaft 6.

At this time, the springs 53 expand along with the abrasion of the brushes 50, ensuring the pressing load of the brushes 50 against the slip rings 9, and the brushes 50 slide stably on the slip rings 9. The distance between the brushes 50 and the brush terminals 54 is shorter than the length of the lead wires 51 in proportion to the amount of compression in the springs 53, the lead wires 51 being housed inside the springs 53 in a slack state. The lead wires 51 extend along with the expansion of the springs 53, ensuring that the expanding action of the springs 53 is stable.

Then, immediately before the brushes 50 reach the abrasion limit, one of the springs 53 contacts the contact 48a, whereby brush abrasion limit immediacy is detected.

Thereafter, the opposite side of the spring 53 from the contact 48a expands along with additional abrasion of the brushes 50 and the brush ends of the springs 53 press the brushes 50 obliquely, ensuring the pressing load of the brushes 50 against the brushes 50 until the abrasion limit.

Next, a brush replacement operation for this automotive alternator will be explained.

First, the cap 42b is removed from the opening 2a, and the fastening between the brush terminals 54 and the holder terminals 47 is released by removing the screws 49. Next, the brushes 50 are pulled radially out of the brush insertion apertures 42 by holding the brush terminals 54. Then, new brushes 50 integrated with springs 53, brush terminals 54, etc., are inserted inside the brush insertion apertures 42a through the opening 2a, and the brush terminals 54 are securely fastened to the holder terminals 47 by means of the screws 49. Thereafter, the cap 42b is fitted onto the head portion of the brush holder portion 42, completing the replacement of the brushes 50.

Next, operation in an automotive vehicle mounted with this automotive alternator will be explained with reference to FIGS. 10 to 12. Moreover, in FIG. 10, 101 indicates the automotive alternator according to Embodiment 1, and 25 and 26 indicate a battery charge lamp (a second lamp) and a brush abrasion warning lamp (a first lamp), respectively, installed in a driver's instrument panel of an automotive vehicle.

In an automotive vehicle, a starter (not shown) is activated by inserting a key into a key switch 24 and turning the key switch 24, driving an engine.

An electric current is supplied to the rotor coil 13 from the battery 27 through the brushes 50 and the slip rings 9, generating a magnetic flux. The first claw-shaped magnetic poles 22 of the first pole core 20 are magnetized into North-seeking (N) poles by this magnetic flux, and the second claw-shaped magnetic poles 23 of the second pole core 21 are magnetized into South-seeking (S) poles. At the same time, rotational torque from the engine is transmitted to the shaft 6 by means of the belt (not shown) and the pulley 4, rotating the rotor 7. Thus, a rotating magnetic field is imparted to the stator winding 16, generating an electromotive force in the stator winding 16. This alternating-current electromotive force passes through the rectifier 12 and is converted into direct current, the battery 27 is charged, and the current is supplied to an electrical load 28.

Figure 11:
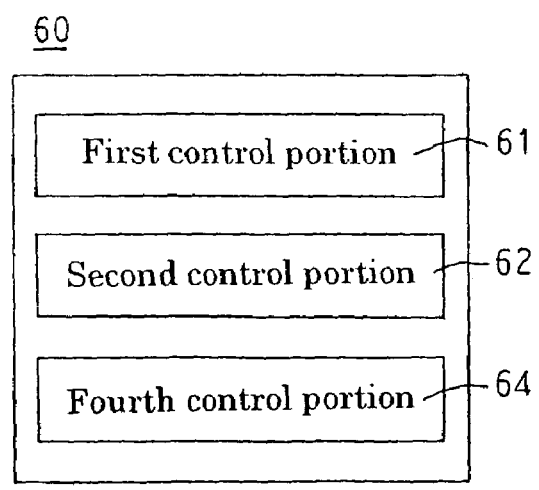
FIG. 11 is a block diagram showing control portions of a voltage regulator in the automotive alternator according to Embodiment 1 of the present invention.
Figure 12:
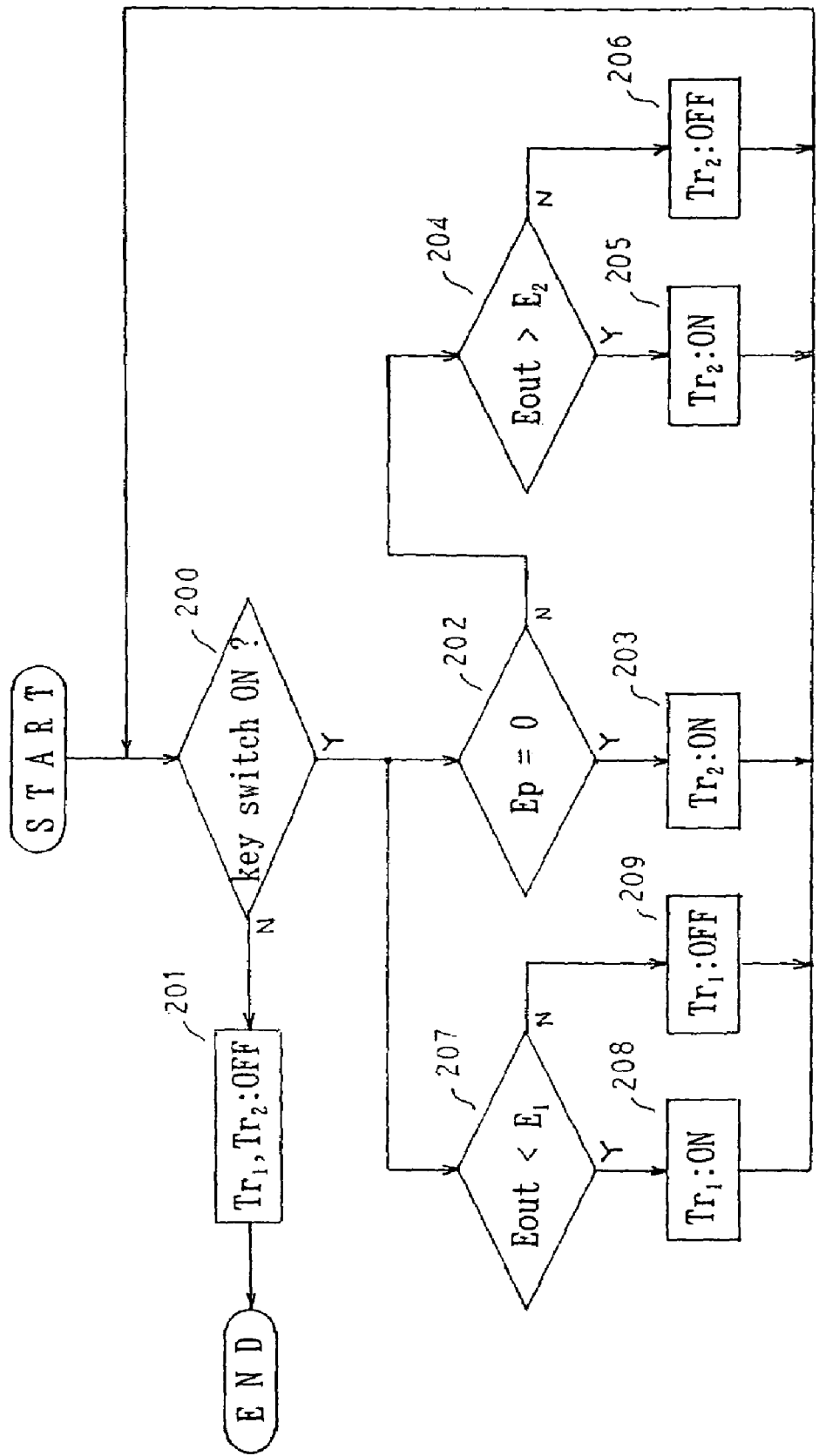
FIG. 12 is a flow chart explaining operation of the control portions of the voltage regulator in the automotive alternator according to Embodiment 1 of the present invention.

Here, the voltage regulator 18, as shown in FIG. 11, is provided with a control portion 60 composed of first, second, and fourth control portions 61, 62, and 64. The first control portion 61 monitors a phase voltage ($E_p$) of the stator winding 16 through a P terminal, and informs the driver that the engine has stopped when the phase voltage is 0 V by switching the battery charge lamp 25 on. The second control portion 62 monitors the output voltage ($E_{out}$) from the rectifier 12 through a B terminal, decides whether that output voltage exceeds a second set voltage ($E_2$), and informs the driver of an overvoltage (abnormality) by switching the battery charge lamp 25 on when the output voltage exceeds the second set voltage. The fourth control portion 64 monitors the output voltage ($E_{out}$) from the rectifier 12 through the B terminal, and controls the passage of electric current to the rotor coil 13 such that the output voltage equals a first set voltage ($E_1$). Moreover, in the case of a 12-volt automotive alternator, $E_1$ and $E_2$ are set to approximately 14 V and 16 V, respectively.

Next, operation of the control portions of the voltage regulator and the brush abrasion detection operation will be explained with reference to the flow chart in FIG. 12.

First, at step 200, a determination is made as to whether the key switch 24 is switched on. At this time, if a voltage is not being applied to an L terminal, the control portion 60 determine that the key switch 24 is switched off and proceed to step 201, switching first and second transistors $Tr_1$ and $Tr_2$ off. If a voltage is being applied to the L terminal, the control portion 60 determine that the key switch 24 is switched on and proceed to step 202.

At step 202, a determination is made as to whether the phase voltage ($E_p$) of the stator winding 16 being monitored through the P terminal is 0 V. When the phase voltage is 0 V, the control portion 60 proceed to step 203 and switch the battery charge lamp 25 on by switching the second transistor $Tr_2$ on. Thus, the driver can confirm that the alternator is not generating power, in other words, that the engine has stopped.

If it is determined that the phase voltage is not 0 V at step 202, the control portion 60 proceed to step 204. At step 204, the output voltage ($E_{out}$) of the rectifier 12 is monitored through the B terminal to determine whether the output voltage ($E_{out}$) is equal to or greater than the second set voltage ($E_2$). If the output voltage is equal to or greater than the second set voltage, the control portion 60 proceed to step 205 and switch the battery charge lamp 25 on by switching the second transistor $Tr_2$ on. Thus, the driver can check for abnormalities (overvoltages) in the automotive vehicle being driven. On the other hand, if it is determined that the output voltage is less than the second set voltage at step 204, the control portion 60 proceed to step 206 and switch the battery charge lamp 25 off by switching the second transistor $Tr_2$ off. Thus, the driver can confirm that the vehicle being driven is running normally.

At step 207, the output voltage ($E_{out}$) of the rectifier 12 is monitored through the B terminal to determine whether the output voltage ($E_{out}$) is less than the first set voltage ($E_1$). The passage of electric current to the rotor coil 13 is controlled by switching the first transistor $Tr_1$ on (step 208) when the output voltage is less than the first set voltage, and switching the first transistor $Tr_1$ off (step 209) when the output voltage is equal to or greater than the first set voltage. Thus, the output voltage of the rectifier 12 is controlled so as to remain constant.

When the brushes 50 becomes abraded, the spring 53 contacts the contact 48a, closing a first switch $SW_1$. Then, a portion of the electric current passing through the rotor coil 13 flows through the brush abrasion warning lamp 26 via the spring 53, the detection terminal 48, and the Q terminal, switching the brush abrasion warning lamp 26 on. Thus, the driver can confirm that it is necessary to change the brushes 50. Brush replacement is performed according to the procedure described above.

In this manner, according to Embodiment 1, brush replacement can be performed by removing and inserting the brushes 50 radially from and into the brush insertion apertures 42 from outside the automotive alternator 101 using the opening 2a in the rear bracket 2A. Thus, because it is not necessary to take the automotive alternator 101 out of the vehicle and dismantle it, the brush replacement operation becomes extremely simple, enabling the amount of time before recommencing operation of the vehicle to be shortened considerably. Furthermore, brush replacement space can also be reduced, enabling the demand for as much passenger compartment space as possible to be ensured within the framework of vehicle codes to be sufficiently satisfied.

Because the lead wires 51 are linked to central portions of the rear end portions of the brushes 50 and are inserted through the flexible tubes 52, the lead wires 51 slacken inside the springs 53, and the stranded wire in the lead wires 51 is prevented from fraying by the flexible tubes 52, preventing the lead wires 51 and the springs 53 from becoming entangled. Thus, incidents involving breaking of the lead wires 51 can be prevented, ensuring passage of the electric current to the rotor coil 13 through the lead wires 51, thereby improving the reliability of the automotive alternator. False detection of brush abrasion resulting from the strands of cut lead wires 51 contacting the contact 48a is similarly prevented.

Because the flexible tubes 52 are prepared using a silicone rubber, elastic properties are imparted to the flexible tubes 52, suppressing spreading of the lead wires 51 as they slacken inside the springs 53. Thus, the lead wires 51 and the springs 53 are reliably prevented from becoming entangled.

Because the springs 53 are prepared from cylindrical compression coil springs, the elastic force of the springs 53 acts stably on the brushes 50 irrespective of pivoting of the springs 53. Thus, asymmetrical wearing of the brushes 50 is suppressed and the brushes 50 slide stably on the slip rings 9. Mechanical shock during contact between the spring 53 and the contact 42a is also alleviated by the elastic force of the spring 53, ensuring a pressing load on the brush 50 even after contact with the contact 42a.

Because the springs 53 are disposed in a compressed state between the brushes 50 and the brush terminals 54 which are linked by the lead wires 51, the elastic force of the springs 53 can act stably on the brushes 50. In addition, the brushes 50, the lead wires 51, the springs 53, and the brush terminals 54 are integrated, simplifying the operation of replacing of the brushes 50.

Because the springs 53 are prepared from stainless steel compression coil springs, the springs 53 have superior corrosion resistance, ensuring that the elastic force from the springs 53 and the passage of electric current through the springs 53 during brush abrasion detection is stable for a long period.

Because the outside diameter D of the springs 53 is formed so as to be larger than the short sides E of the brushes 50 and the contact 48a of the detection terminal 48 is disposed outside the long side of the corresponding brush 50, contact between the brush 50 and the contact 48a is avoided, preventing false detection of the brush abrasion limit.

Furthermore, the aperture shape of the brush insertion apertures 42a is formed so as to have an internal shape having arc portions having a diameter D' centered on a center of a rectangular shape at central portions of first and second long sides of the rectangular shape (length of short sides: E'; length of long sides: F'). E', F', and D' are set slightly larger than E, F, and D. Thus, the brushes 50 are guided by the four corners of the rectangular shape of the brush insertion apertures 42a and can move smoothly inside the brush insertion apertures 42a. Similarly, the springs 53 are guided by the arc portions of the brush insertion apertures 42a having the diameter D' and can move smoothly inside the brush insertion apertures 42a. Thus, misalignment of the brushes 50 and the springs 53 resulting from external vibration is prevented.

Because the brushes 50 are prepared using a mixture of a copper powder and graphite, sliding between the brushes 50 and the slip rings 9 is performed smoothly, and electrical resistance at the sliding portion can be reduced.

In a brush abrasion detection system according to Embodiment 1, because the automotive alternator 101 is mounted and the brush abrasion warning lamp 26 is switched on by contact between the spring 53 and the contact 48a, the driver can check for the abrasion of the brushes 50 visually, enabling brush replacement to be performed swiftly. Thus, the occurrence of vehicle breakdown and discharge of the battery 27 resulting from defective power generation can be prevented.

Because the abrasion of the brushes 50 is detected at a position where the remaining length of the brushes 50 is 2 mm from the abrasion limit line 50x, the vehicle remains operable for approximately 30,000 km after detection. Thus, there is ample time for brush replacement after detection of abrasion of the brushes 50, enabling the occurrence of vehicle breakdown and discharge of the battery resulting from defective power generation to be reliably prevented.

Moreover, in Embodiment 1 above, flexible tubes 52 made of a silicone rubber are used, but the material for the flexible tubes 52 is not limited to the silicone rubber provided that it is a material having flexibility and for example, a fluororubber can be used.

Furthermore, in Embodiment 1 above, stainless steel springs 53 are used but the material for the springs 53 is not limited to a stainless steel provided that it is a metal material having spring properties, and a carbon steel, for example, can be used.

Embodiment 2

Figure 13:
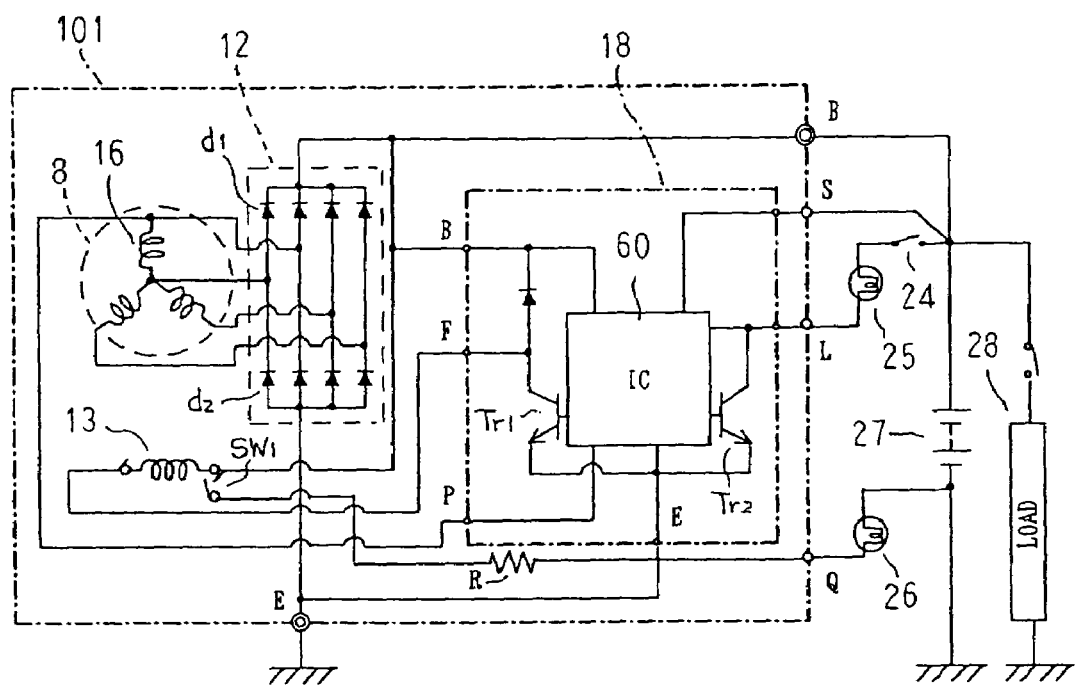
FIG. 13 is an electrical circuit diagram for an automotive vehicle mounted with an automotive alternator according to Embodiment 2 of the present invention.

In Embodiment 2, as shown in FIG. 13, a resistor R is inserted into a wiring pathway between the first switch $SW_1$ and the Q terminal. Moreover, the rest of this embodiment is constructed in a similar manner to Embodiment 1 above.

According to Embodiment 2, when the spring 53 contacts the contact 48a, the first switch $SW_1$ is closed, and a portion of the electric current flowing through the rotor coil 13 is diverted to flow through the brush abrasion warning lamp 26. At this time, because the resistor R is inserted in series into the wiring pathway between the first switch $SW_1$ and the Q terminal, the electric current flowing into the wiring pathway is reduced, ensuring that the amount of excitation current flowing to the rotor coil 13 is stable. Furthermore, because the electric current flowing into the wiring pathway is a weak current, sparks or arcs do not occur during closing of the first switch $SW_1$, suppressing damage to the contact 48a, and thereby improving reliability.

Now, it has been confirmed that when the automotive alternator 101 is a 12-volt system, the occurrence of sparks and arcs can be reliably prevented during closing of the first switch $SW_1$ if the resistance value of the electric current path where the portion of the electric current flowing through the rotor coil 13 is diverted to flow through the contact 48a during closing of the contact 48a is set to five times the resistance value of the rotor coil 13. Thus, it is desirable for the resistor R to be set such that the resistance value of the electric current path flowing through the contact 48a during closing of the contact 48a is equal to or greater than five times the resistance value of the rotor coil 13.

Embodiment 3

Figure 14:
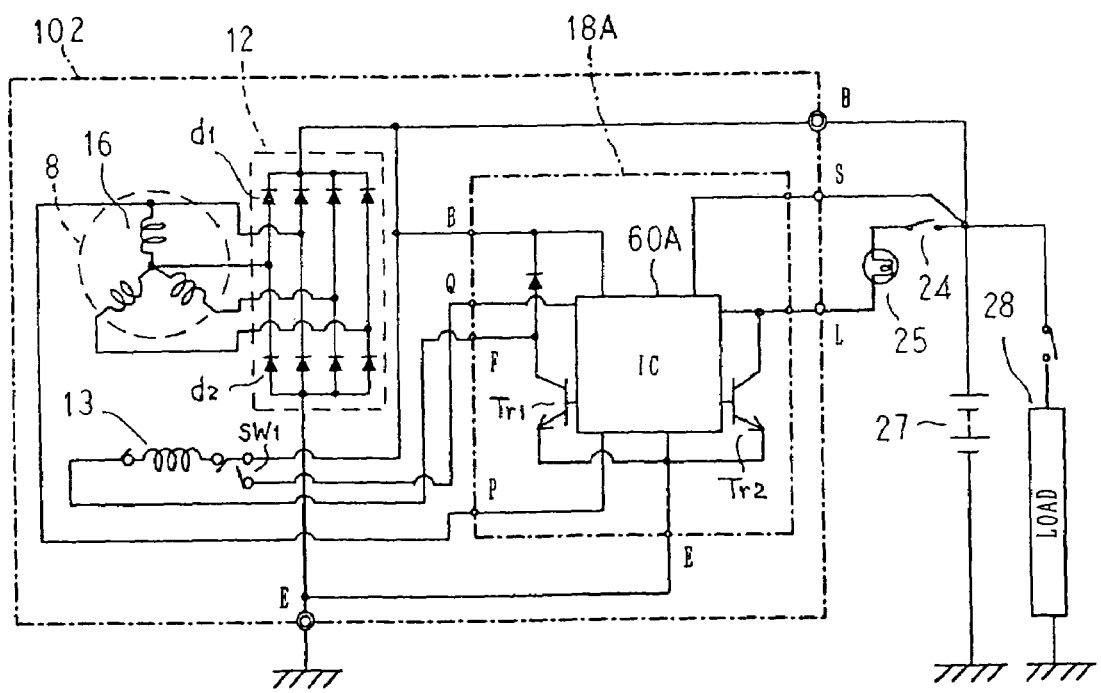
FIG. 14 is an electrical circuit diagram for an automotive vehicle mounted with an automotive alternator according to Embodiment 3 of the present invention.
Figure 15:
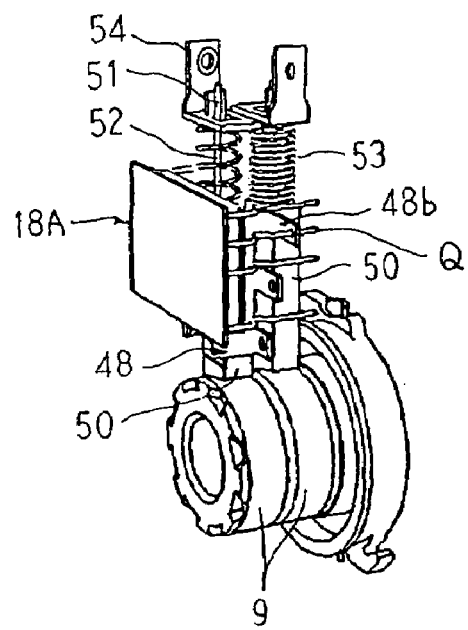
FIG. 15 is a perspective showing a vicinity of brushes in the automotive alternator according to Embodiment 3 of the present invention.
Figure 16:
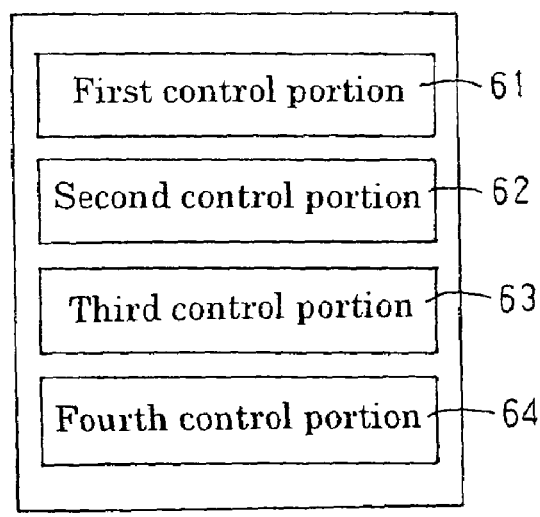
FIG. 16 is a block diagram showing control portions of a voltage regulator in the automotive alternator according to Embodiment 3 of the present invention.
Figure 17:
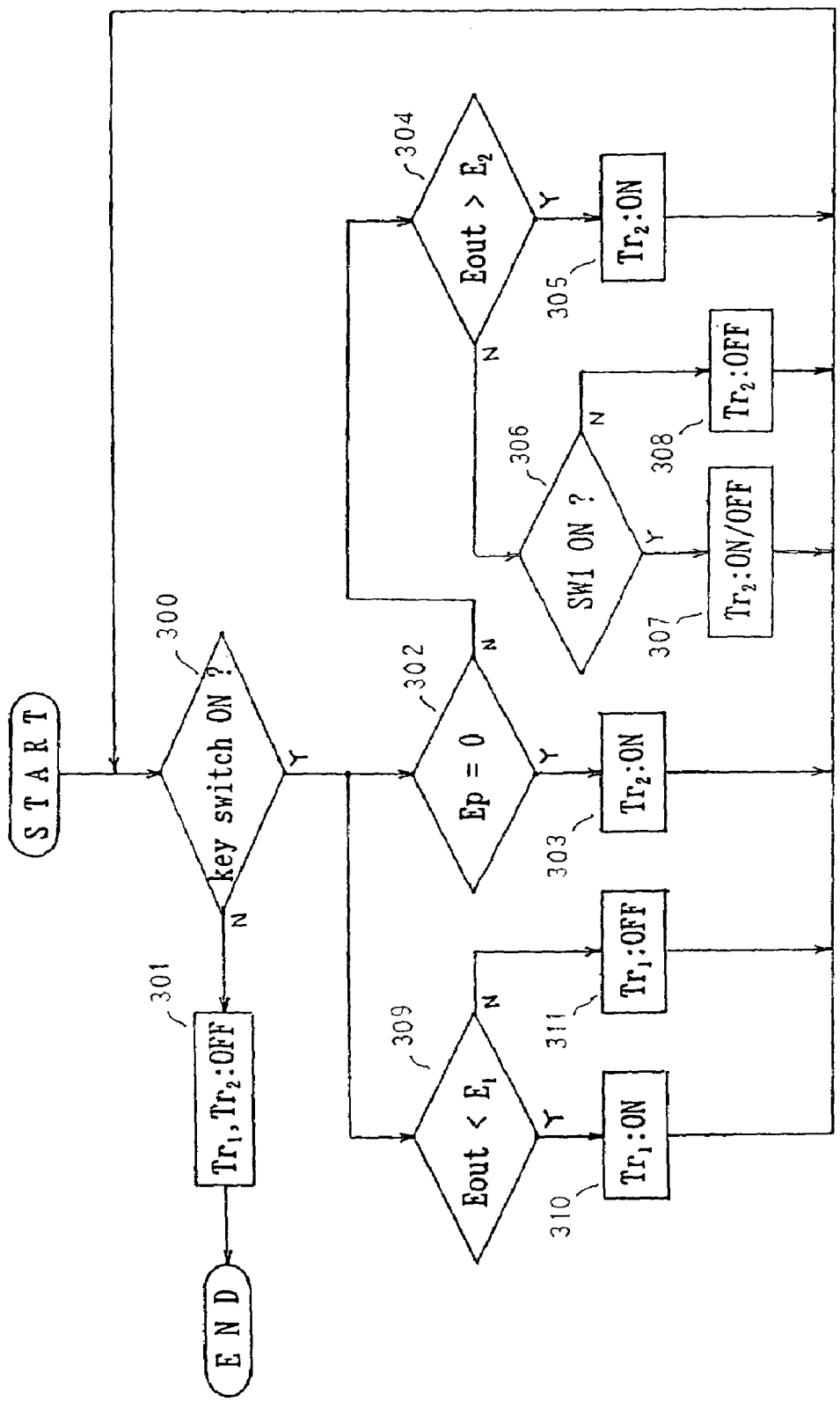
FIG. 17 is a flow chart explaining operation of the control portions of the voltage regulator in the automotive alternator according to Embodiment 3 of the present invention.

FIG. 14 is an electrical circuit diagram for an automotive vehicle mounted with an automotive alternator according to Embodiment 3 of the present invention, FIG. 15 is a perspective showing a vicinity of brushes in the automotive alternator according to Embodiment 3 of the present invention, FIG. 16 is a block diagram showing control portions of a voltage regulator in the automotive alternator according to Embodiment 3 of the present invention, and FIG. 17 is a flow chart explaining operation of the control portions of the voltage regulator in the automotive alternator according to Embodiment 3 of the present invention.

In FIGS. 14 to 16, a control portion 60A of a voltage regulator 18A of an automotive alternator 102 is constituted by first to fourth control portions 61 to 64. An end terminal 48b of the abrasion detection terminal 48 projects inside the circuit housing portion 44 of the brush holding apparatus 40, and is joined to the Q terminal of the voltage regulator 18A by soldering, etc. The third control portion 63 monitors for electric current flowing through the Q terminal during closing of the first switch $SW_1$, and when an electric current is input through the Q terminal, informs the driver that it is necessary to change the brushes 50 by flashing the battery charge lamp 25 on and off.

Moreover, the rest of this embodiment is constructed in a similar manner to Embodiment 1 above.

Next, operation of the control portions of the voltage regulator will be explained with reference to the flow chart in FIG. 17.

First, at step 300, a determination is made as to whether the key switch 24 is switched on. At this time, if a voltage is not being applied to an L terminal, the control portion 60A determine that the key switch 24 is switched off and proceed to step 301, switching the first and second transistors $Tr_1$ and $Tr_2$ off. If a voltage is being applied to the L terminal, the control portion 60A determine that the key switch 24 is switched on and proceed to step 302.

At step 302, a determination is made as to whether the phase voltage ($E_p$) of the stator winding 16 being monitored through the P terminal is 0 V. When the phase voltage is 0 V, the control portion 60A proceed to step 301 and switch the battery charge lamp 25 on by switching the second transistor $Tr_2$ on. Thus, the driver can confirm that the alternator is not generating power, in other words, that the engine has stopped.

If it is determined that the phase voltage is not 0 V at step 302, the control portion 60A proceed to step 304. At step 304, the output voltage ($E_{out}$) of the rectifier 12 is monitored through the B terminal to determine whether the output voltage ($E_{out}$) is equal to or greater than the second set voltage ($E_2$). If the output voltage is equal to or greater than the second set voltage, the control portion 60A proceed to step 305 and switch the battery charge lamp 25 on by switching the second transistor $Tr_2$ on. Thus, the driver can check for abnormalities (overvoltages) in the automotive vehicle being driven.

On the other hand, if it is determined that the output voltage is less than the second set voltage at step 304, the control portion 60A proceed to step 306. At step 306, the control portion 60A monitor for the presence of an electric current input through the Q terminal, and when an electric current is input through the Q terminal, the control portion 60A determine that the first switch $SW_1$ is switched on and proceed to step 307. At step 307, the control portion 60A switch the second transistor $Tr_2$ on and off in a pulse train, thereby flashing the battery charge lamp 25 on and off to inform the driver that it is necessary to change the brushes 50. On the other hand, if no electric current is being input through the Q terminal at step 306, the control portion 60A proceed to step 308 and switch the battery charge lamp 25 off by switching the second transistor $Tr_2$ off.

At step 309, the output voltage ($E_{out}$) of the rectifier 12 is monitored through the B terminal to determine whether the output voltage ($E_{out}$) is less than the first set voltage ($E_1$). The passage of electric current to the rotor coil 13 is controlled by switching on the first transistor $Tr_1$ (step 310) when the output voltage is less than the first set voltage, and switching off the first transistor $Tr_1$ (step 311) when the output voltage is equal to or greater than the first set voltage. Thus, the output voltage of the rectifier 12 is controlled so as to remain constant.

According to Embodiment 3, the battery charge lamp 25 is switched on when the engine of an automotive vehicle is stopped and is switched off when the engine is running. If an overvoltage occurs while running, the battery charge lamp 25 is switched on to inform the driver of an abnormality in the vehicle. In addition, if the first switch $SW_1$ is closed by brush abrasion during normal running, the driver is informed of the need for brush replacement by flashing the battery charge lamp 25 on and off.

Because overvoltage detection (step 304) and brush abrasion detection (step 306) are performed when the engine is running ($E_p \neq 0$ V), it is possible to confirm that the battery charge lamp 25 is functioning normally by checking that the battery charge lamp 25 is switched on when the key switch 24 is switched on. In other words, even if the first switch $SW_1$ is closed by brush abrasion, the battery charge lamp 25 is switched on without flashing on and off.

Furthermore, according to Embodiment 3, an absence of power generation or an overvoltage is announced by switching the battery charge lamp 25 on, and brush abrasion detection is announced by flashing the battery charge lamp 25 on and off. Thus, because the announcements of an overvoltage (or an absence of power generation) and brush abrasion detection are respectively distinguished by switching the battery charge lamp 25 on or flashing the battery charge lamp 25 on and off, use of one lamp can be shared, enabling the brush abrasion warning lamp 26 required in Embodiment 1 above to be omitted, thereby enabling simplification of the vehicle wiring harness.

In addition, because the electrical circuits constituting the first control portion 61 for diagnosing an absence of power generation in the alternator, the second control portion 62 for diagnosing overvoltages in the alternator, the third control portion 63 for detecting the brush abrasion limit immediacy, and the fourth control portion 64 for keeping the output voltage of the alternator constant are incorporated into the voltage regulator 18A, the configuration of the electrical circuits is facilitated, enabling reductions in size.

Embodiment 4

Figure 18:
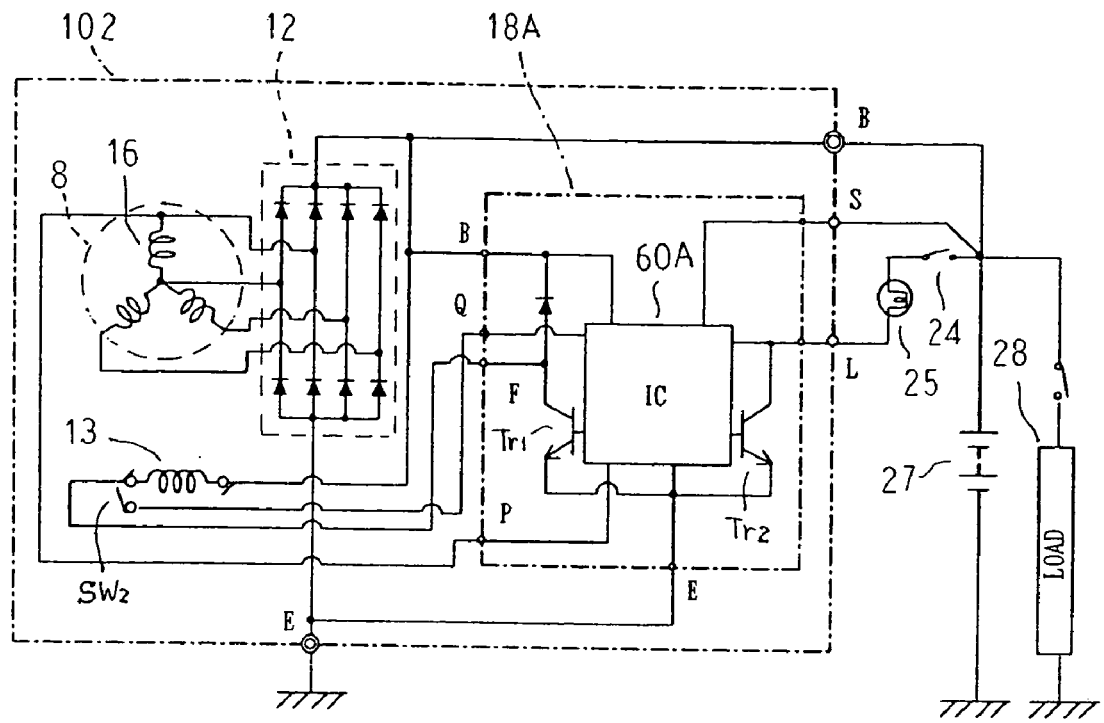
FIG. 18 is an electrical circuit diagram for an automotive vehicle mounted with an automotive alternator according to Embodiment 4 of the present invention.

In Embodiment 3 above, the abrasion detection terminal 48 is disposed on an input side of the rotor coil 13, but in Embodiment 4, as shown in FIG. 18., the abrasion detection terminal 48 is disposed on an output side of the rotor coil 13, abrasion limit immediacy of the brushes 50 being detected by closing of a second switch $SW_2$.

Consequently, similar effects to those in Embodiment 3 above can also be achieved in Embodiment 4.

Embodiment 5

Figure 19:
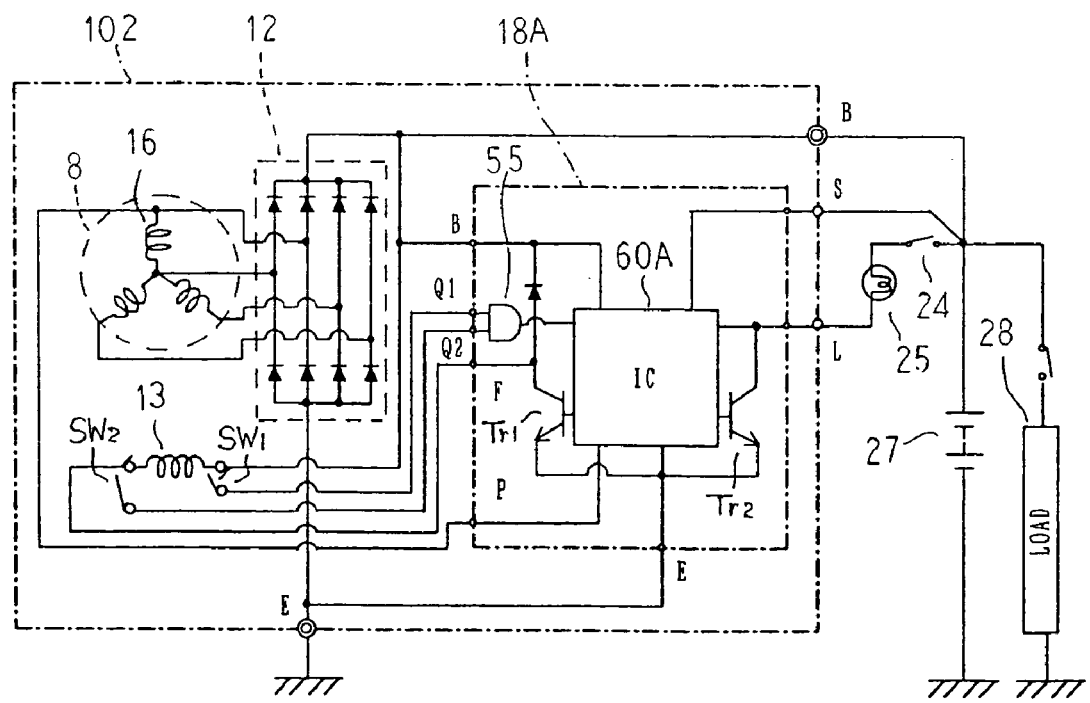
FIG. 19 is an electrical circuit diagram for an automotive vehicle mounted with an automotive alternator according to Embodiment 5 of the present invention.

In Embodiment 3 above, the abrasion detection terminal 48 is disposed on an input side of the rotor coil 13, but in Embodiment 5, as shown in FIG. 19, abrasion detection terminals 48 are disposed on both the input side and the output side of the rotor coil 13, and brush abrasion is detected by the fourth control portion 64 by inputting an electric current flowing during closing of a first switch $SW_1$ or a second switch $SW_2$ from the $Q_1$ terminal or the $Q_2$ terminal through an OR gate 55.

In Embodiment 5, even if the pair of brushes 50 do not abrade uniformly, the battery charge lamp 25 flashes on and off if either the first switch $SW_1$ or the second switch $SW_2$ is closed, enabling the driver to be informed of brush abrasion limit immediacy. Thus, brush abrasion limit immediacy is reliably announced, enabling the occurrence of defective power generation and defective charging of the battery to be prevented.

Embodiment 6

Figure 20:
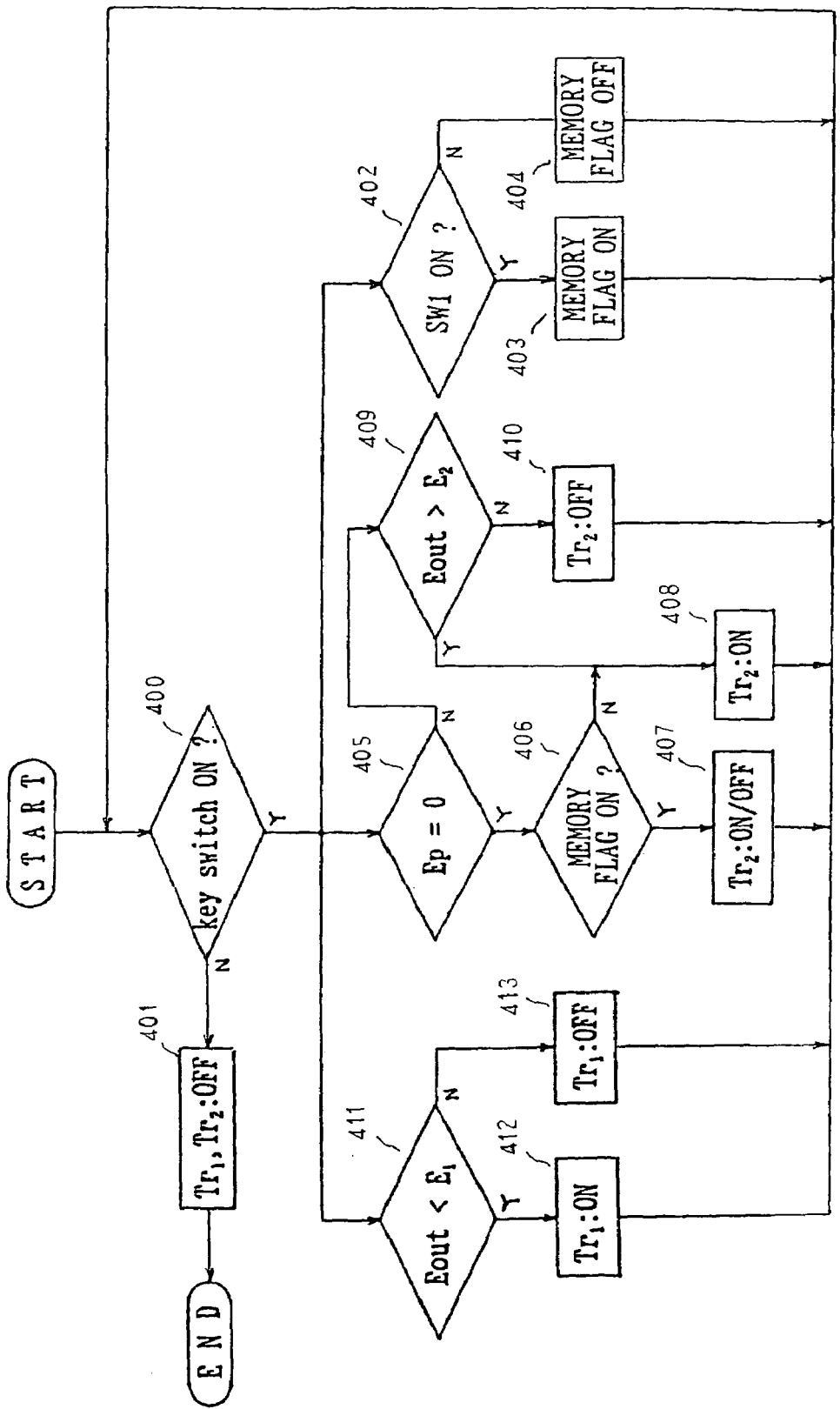
FIG. 20 is a flow chart explaining operation of control portions of a voltage regulator in an automotive alternator according to Embodiment 6 of the present invention.

FIG. 20 is a flow chart explaining operation of control portions in an automotive vehicle mounted with an automotive alternator according to Embodiment 6 of the present invention.

Moreover, a circuit diagram for the automotive vehicle according to Embodiment 6 of the present invention is similar to that of Embodiment 3.

Here, operation of the control portions of the voltage regulator will be explained with reference to the flow chart in FIG. 20.

First, at step 400, a determination is made as to whether the key switch 24 is switched on. At this time, if a voltage is not being applied to an L terminal, the control portion determines that the key switch 24 is switched off and proceeds to step 401, switching off the first and second transistors $Tr_1$ and $Tr_2$. If a voltage is being applied to the L terminal, the control portion determines that the key switch 24 is switched on and proceeds to step 402.

At step 402, the control portion monitors for the presence of an electric current input through the Q terminal, and when an electric current is input through the Q terminal, the control portion determines that the first switch $SW_1$ is switched on and switches a flag on in a memory (step 403), and when an electric current is not input through the Q terminal, the control portion determines that the first switch $SW_1$ is switched off and switches the flag off in the memory (step 404).

At step 405, a determination is made as to whether the phase voltage ($E_p$) of the stator winding 16 being monitored through the P terminal is 0 V. When the phase voltage is 0 V, the control portion proceeds to step 406 and determines whether the flag in the memory is on or off. If the flag is on, the control portion switches the second transistor $Tr_2$ on and off in a pulse train, thereby flashing the battery charge lamp 25 on and off (step 407), and if the flag is off, the second transistor $Tr_2$ is switched on, thereby switching the battery charge lamp 25 on (step 408). Thus, the driver can check for brush abrasion limit immediacy by the flashing of the battery charge lamp 25, and in addition, can confirm that the alternator is not generating power, in other words, that the engine has stopped by the switching on of the battery charge lamp 25.

If it is determined that the phase voltage is not 0 V at step 405, the control portion proceeds to step 409. At step 409, the output voltage ($E_{out}$) of the rectifier 12 is monitored through the B terminal to determine whether the output voltage ($E_{out}$) is equal to or greater than the second set voltage ($E_2$). If the output voltage is equal to or greater than the second set voltage, the control portion proceeds to step 408 and switches the battery charge lamp 25 on by switching the second transistor $Tr_2$ on. Thus, the driver can check for abnormalities (overvoltages) in the automotive vehicle being driven. On the other hand, if it is determined that the output voltage is less than the second set voltage at step 409,
the control portion proceeds to step 410 and switches the battery charge lamp 25 off by switching the second transistor $Tr_2$ off.

At step 411, the output voltage ($E_{out}$) of the rectifier 12 is monitored through the B terminal to determine whether the output voltage ($E_{out}$) is less than the first set voltage ($E_1$). The passage of electric current to the rotor coil 13 is controlled by switching the first transistor $Tr_1$ on (step 412) when the output voltage is less than the first set voltage, and switching the first transistor $Tr_1$ off (step 413) when the output voltage is equal to or greater than the first set voltage. Thus, the output voltage of the rectifier 12 is controlled so as to remain constant.

In Embodiment 6, the battery charge lamp 25 is switched on when the engine of an automotive vehicle is stopped and is switched off when the engine is running. If an overvoltage occurs while running, the battery charge lamp 25 is switched on to inform the driver of an abnormality in the vehicle being driven. In addition, if the first switch $SW_1$ is closed by brush abrasion, a flag is switched on in the memory by the third control portion 63. Then, if the flag is switched on in the memory when the engine of the vehicle is stopped, the driver is informed of the need for brush replacement by flashing the battery charge lamp 25 on and off.

According to Embodiment 6, when brush abrasion limit immediacy is detected by the third control portion 63, the battery charge lamp 25 is flashed on and off to inform the driver only when the vehicle is stopped. Thus, the driver is not startled by the battery charge lamp 25 flashing on and off suddenly while moving, thereby ensuring safe operation of the vehicle.

Embodiment 7

Figure 21:
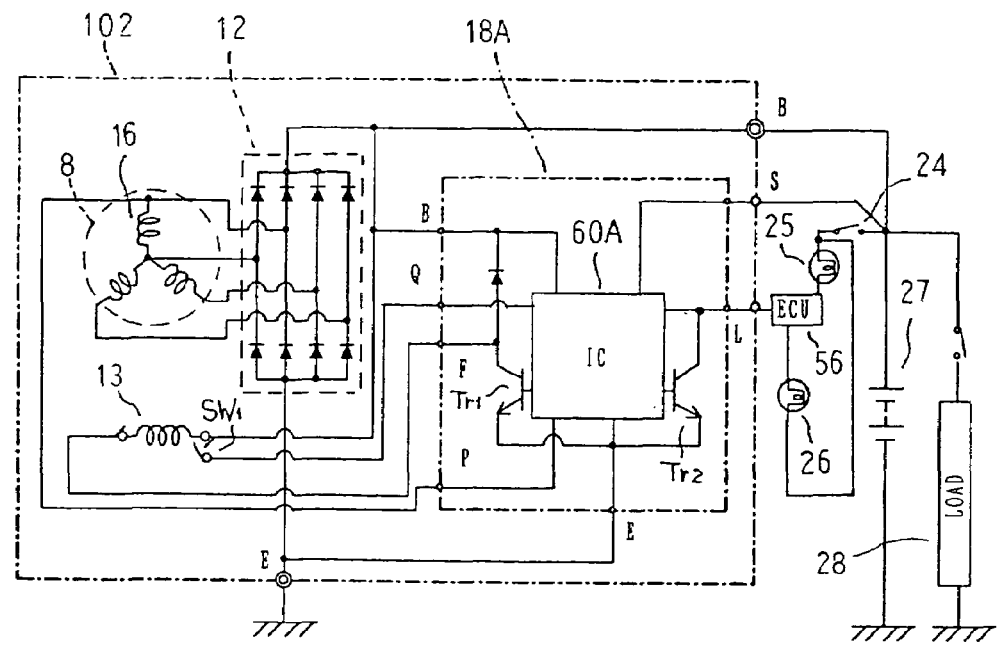
FIG. 21 is an electrical circuit diagram for an automotive vehicle mounted with an automotive alternator according to Embodiment 7 of the present invention.

FIG. 21 is an electrical circuit diagram for an automotive vehicle mounted with an automotive alternator according to Embodiment 7 of the present invention.

In FIG. 21, an electronic control unit (ECU) 56 functioning as an alternator external controlling means functions such that when a control signal from the L terminal is input thereto, the battery charge lamp 25 is connected to the L terminal if the control signal is a standing wave signal, and the brush abrasion warning lamp 26 is connected to the L terminal if the control signal is a pulse train signal. The first control portion 61 of the voltage regulator 18A is constructed such that a standing wave signal is output to the ECU 56 through the L terminal and the second transistor $Tr_2$ is switched on if it is determined that the phase voltage is 0 V. The second control portion 62 of the voltage regulator 18A is constructed such that a standing wave signal is output to the ECU 56 through the L terminal and the second transistor $Tr_2$ is switched on if it is determined that the output voltage of the rectifier 12 is an overvoltage. The third control portion 63 of the voltage regulator 18A is constructed such that a pulse train signal is output to the ECU 56 through the L terminal and the second transistor $Tr_2$ is switched on if it is determined that a first switch $SW_1$ is closed.

Moreover, the rest of this embodiment is constructed in a similar manner to Embodiment 3 above.

In Embodiment 7, the first control portion 61 outputs a standing wave signal to the ECU 56 through the L terminal and switches the second transistor $Tr_2$ on if it determines that the phase voltage is 0 V. Then, the ECU 56 connects the battery charge lamp 25 to the L terminal. Thus, the battery charge lamp 25 is switched on to inform the driver that the engine has stopped.

The second control portion 62 outputs a standing wave signal to the ECU 56 through the L terminal and switches the second transistor $Tr_2$ on if it determines that the output voltage of the rectifier 12 has exceeded the second set voltage. Then, the ECU 56 connects the battery charge lamp 25 to the L terminal. Thus, the battery charge lamp 25 is switched on to inform the driver that there is an overvoltage (abnormality) in the alternator.

The third control portion 63 outputs a pulse train signal to the ECU 56 through the L terminal and switches the second transistor $Tr_2$ on if it is determines that the first switch $SW_1$ has closed. Then, the ECU 56 connects the brush abrasion warning lamp 26 to the L terminal. Thus, the brush abrasion warning lamp 26 is switched on to inform the driver of brush abrasion limit immediacy.

Consequently, similar effects to those in Embodiment 3 above can also be achieved in Embodiment 7.

Furthermore, according to Embodiment 7, because the brush abrasion limit immediacy is announced by switching the brush abrasion warning lamp 26 on, the driver is not startled by events such as the brush abrasion warning lamp 26 flashing on and off suddenly, thereby ensuring safe operation of the vehicle.

Embodiment 8

Figure 22:
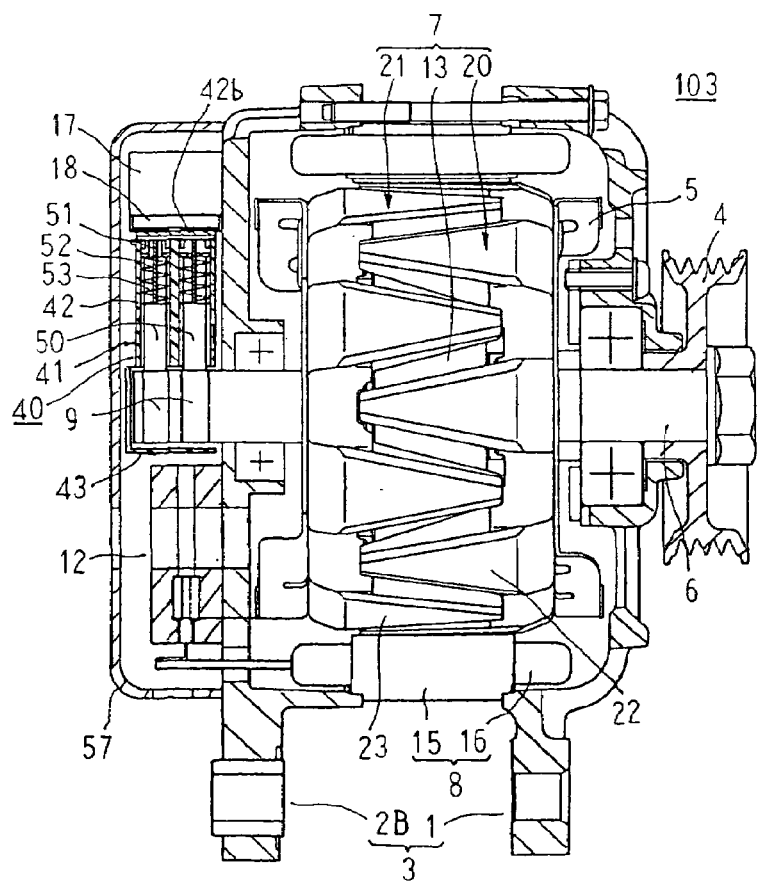
FIG. 22 is a longitudinal section showing an automotive alternator according to Embodiment 8 of the present invention.
Figure 23:
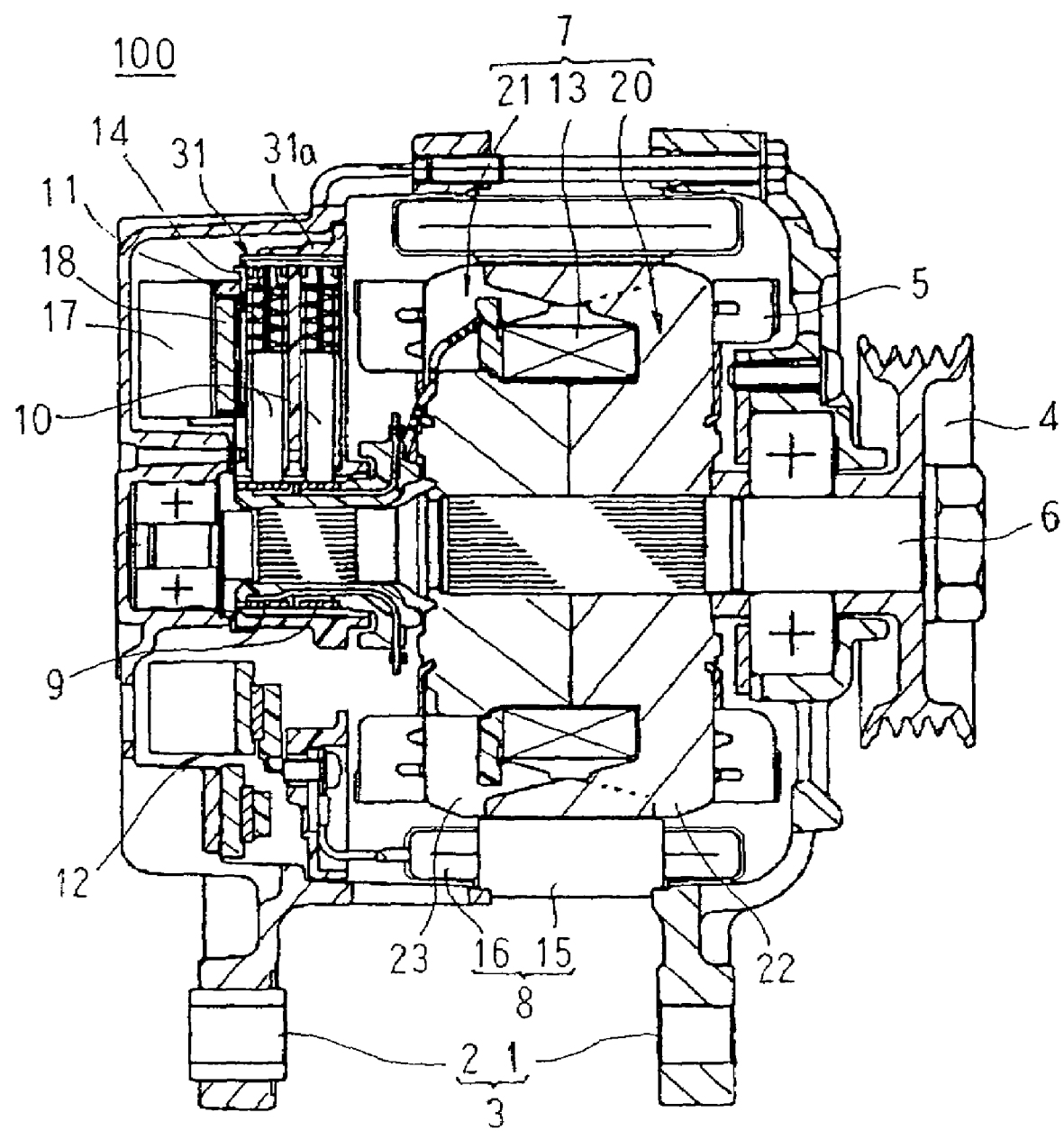
FIG. 23 is a longitudinal section showing a conventional automotive alternator.
Figure 24:
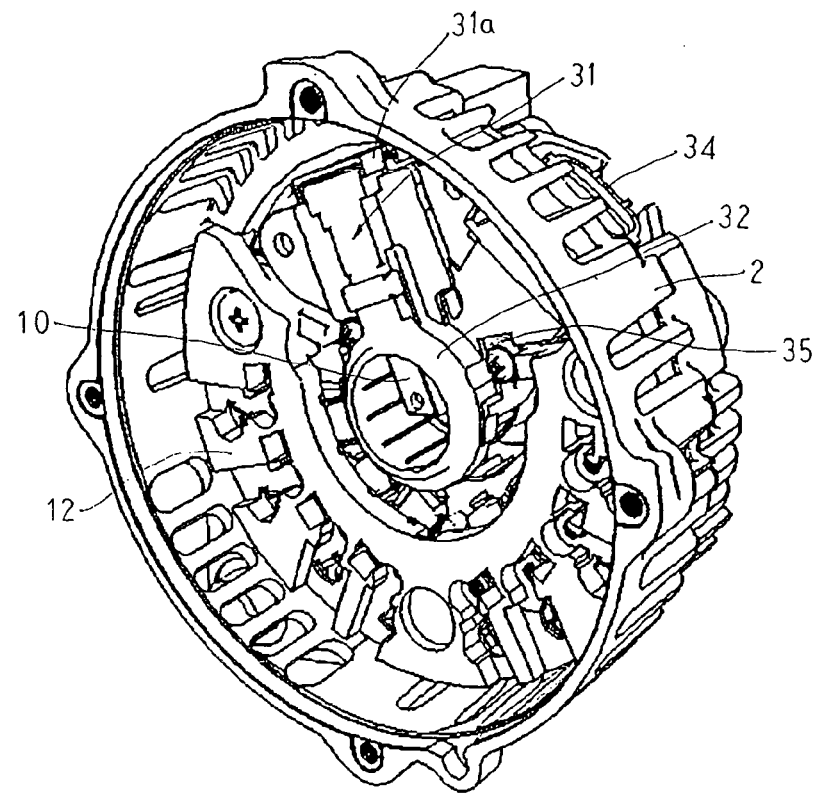
FIG. 24 is a perspective of a rear bracket interior portion of the conventional automotive alternator viewed from a front end.
Figure 25:
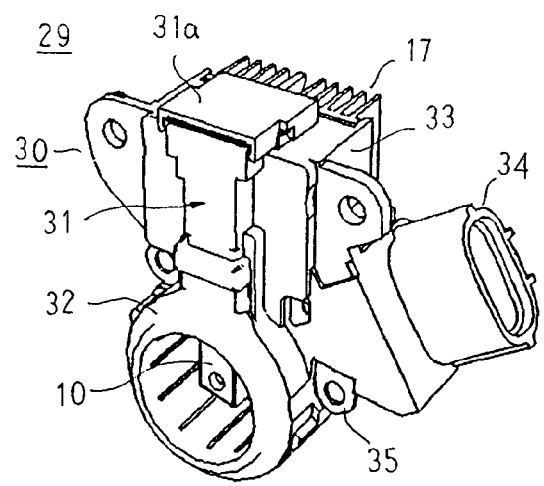
FIG. 25 is a perspective showing a brush holding apparatus used in the conventional automotive alternator.
Figure 26:
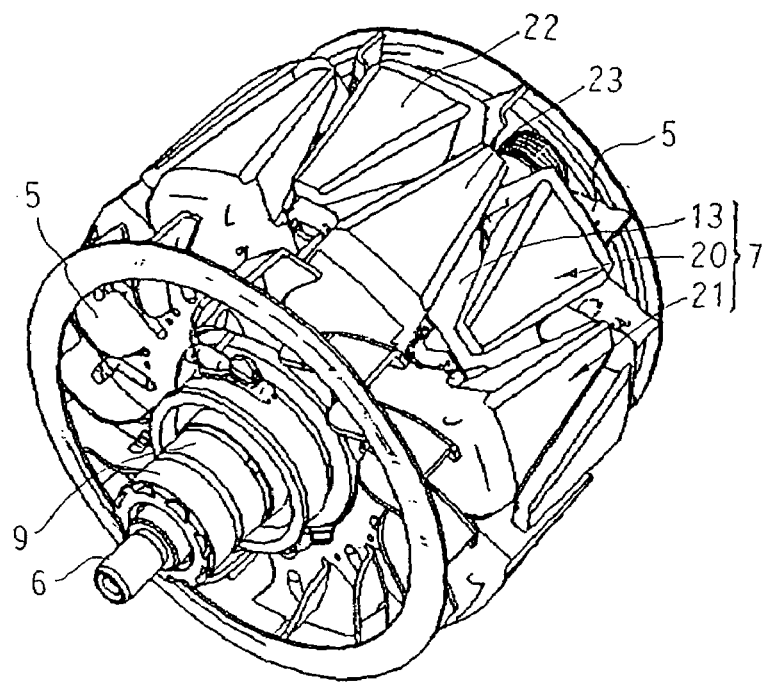
FIG. 26 is a perspective showing a rotor used in the conventional automotive alternator.
Figure 27:
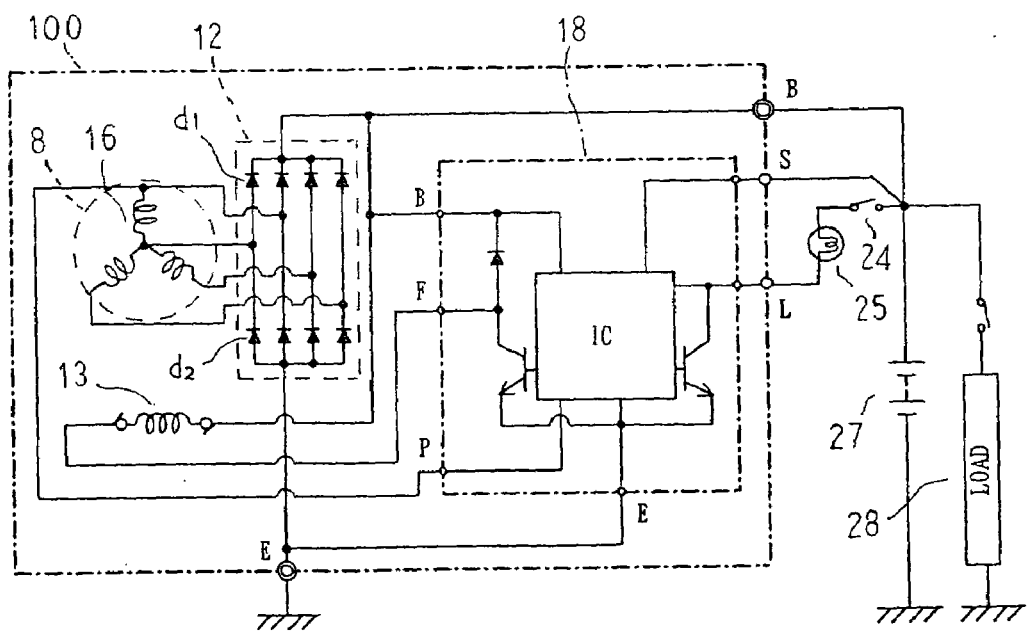
FIG. 27 is an electrical circuit diagram for an automotive vehicle mounted with the conventional automotive alternator.

FIG. 22 is a longitudinal section showing an automotive alternator according to Embodiment 8 of the present invention.

In FIG. 22, a rotor 7 is rotatably mounted inside a case 3 constituted by a front bracket 1 and a rear bracket 2B by means of a shaft 6, and a stator 8 is fixed to an inner wall surface of the case 3 so as to cover an outer circumferential side of the rotor 7.

The shaft 6 is rotatably supported in the front bracket 1 and the rear bracket 2B. A pulley 4 is fixed to a first end portion of the shaft 6 projecting out of the front bracket 1, and a pair of slip rings 9 is fixed to a second end portion of the shaft 6 projecting out of the rear bracket 2B.

A brush holding apparatus 40 is securely fastened to an outer wall surface of the rear bracket 2B such that an central axis of a shaft insertion portion 43 is aligned with a central axis of the rear bracket 2B. The second end portion of the shaft 6 is inserted inside the shaft insertion portion 43, a pair of brushes 50 being placed in contact with the pair of slip rings 9 by the force of springs 53, and electrically connected. A rectifier 12 is securely fastened to an outer wall surface of the rear bracket 2 so as to be positioned opposite the brush holding apparatus 40 across the shaft 6.

In addition, a rear cover 57 is securely fastened to an outer wall surface of the rear bracket 2B so as to cover the brush holding apparatus 40 and the rectifier 12 from an axial direction of the shaft 6.

Moreover, the rest of this embodiment is constructed in a similar manner to Embodiment 1 above. Because detection and announcement of brush abrasion limit immediacy are performed in a similar manner to Embodiment 1 above, explanation thereof will be omitted here.

Brush replacement in an automotive alternator 103 constructed in this manner will now be explained.

First, the rear cover 57 is removed by releasing the fastening between the rear cover 57 and the rear bracket 2B. Then, the brush holding apparatus 40 is pulled out in an axial direction after releasing the fastening between the brush holding apparatus 40 and the rear bracket 2B. Next, the cap 42b is removed, and the fastening between the brush terminals 54 and the holder terminals 47 is released by removing the screws 49. Then, the brushes 50 are pulled out of the brush insertion apertures 42 by holding the brush terminals 54. Next, new brushes 50 integrated with springs 53, brush terminals 54, etc., are inserted inside the brush insertion apertures 42a, and the brush terminals 54 are securely fastened to the holder terminals 47 by means of the screws 49. Thereafter, the cap 42b is fitted onto the head portion of the brush holder portion 42.

Then, the brush holding apparatus 40 with the brushes replaced is fitted onto the shaft 6 from an axial direction and securely fastened to the rear bracket 2B. In addition, the rear cover 57 is securely fastened to the rear bracket 2B, completing the brush replacement.

Consequently, in Embodiment 8, because the abrasion limit immediacy of the brushes 50 is also announced to the driver by switching the brush abrasion warning lamp 26 on in a similar manner to Embodiment 1 above, brush replacement can be performed swiftly, enabling the occurrence of vehicle breakdown and discharge of the battery 27 resulting from defective power generation to be prevented.

Furthermore, according to Embodiment 8, the brush replacement operation is performed by removing the rear cover 57, pulling out the brush holding apparatus 40 in an axial direction, mounting the brush holding apparatus 40 with the brushes replaced to the shaft 6 from an axial direction, securely fastening the brush holding apparatus 40 to the rear bracket 2B, and securely fastening the rear cover 57 to the rear bracket 2B. Thus, compared to conventional devices, which additionally require removal, dismantling, reassembly, and replacement of the automotive alternator from and to the vehicle, the brush replacement operation is simplified, enabling working time to be shortened.

Moreover, in Embodiment 8 above, replacement of the brushes 50 is explained as being performed by removing the brush holding apparatus 40 from the rear bracket 2B, but replacement of the brushes 50 may also be performed by removing the rear cover 57, and then removing the cap 42b with the brush holding apparatus 40 still securely fastened to the rear bracket 2B. In that case, the need for removal and replacement of the brush holding apparatus 40 is eliminated, enabling working time to be shortened further.

Furthermore, it goes without saying that the automotive alternator 103 from Embodiment 8 may also be used instead of the automotive alternators 101 and 102 in Embodiments 2 to 7 above.

The present invention is constructed in the above manner and exhibits the effects described below.

As explained above, according to one aspect of the present invention, there is provided an automotive alternator including: a case; a shaft rotatably supported in the case;

a rotor fixed to the shaft and disposed inside the case for generating a rotating magnetic field, the rotor being provided with:

a rotor coil in which a magnetic flux is generated by on passage of an electric current;

and a plurality of magnetic poles magnetized by the magnetic flux generated in the rotor coil;

a stator mounted to the case so as to cover an outer circumferential side of the rotor, the stator being provided with a stator winding in which an electromotive force is generated by the rotating magnetic field generated by the rotor;

a pair of electric current supplying members disposed so as to be separated in an axial direction on a first end portion of the shaft and be able to rotate together with the shaft, the pair of electric current supplying members being electrically connected in series by means of the rotor coil; and a brush holding apparatus disposed inside the case so as to be positioned radially outside the pair of electric current supplying members, wherein: the brush holding apparatus is provided with:

a brush holder portion in which a pair of brush insertion apertures is formed such that an aperture direction of each of the brush insertion apertures is perpendicular to a center axis of the shaft, the pair of brush insertion apertures being separated in an axial direction of the shaft;

a cap removably mounted to a head portion of the brush holder portion for covering the pair of brush insertion apertures; a pair of brushes each housed inside the pair of brush insertion apertures so as to be able to move freely in the aperture direction;

a pair of brush terminals constituting input and output terminals of the brushes;

a pair of lead wires each having a first end linked to a first end portion of the brushes and a second end linked to the brush terminals;

electrically-conductive elastic members disposed inside each of the brush insertion apertures for placing a second end of each of the brushes in elastic contact with the electric current supplying members by forcing the brushes toward the shaft; and an abrasion detection terminal disposed in at least one of the pair of brush insertion apertures, the abrasion detection terminal being provided with a contact for contacting at least one of the elastic members when the brushes are abraded by a predetermined amount; and an opening is disposed in the case radially outside the brush holder portion so as to expose the cap, thereby providing an automotive alternator enabling brush abrasion to be detected before the occurrence of defective power generation or defective charging of the battery, and in addition, enabling brush replacement without dismantling the alternator.

According to another aspect of the present invention, there is provided an automotive alternator including:

a case; a shaft rotatably supported in the case; a rotor fixed to the shaft and disposed inside the case for generating a rotating magnetic field, the rotor being provided with:

a rotor coil in which a magnetic flux is generated on passage of an electric current; and a plurality of magnetic poles magnetized by the magnetic flux generated in the rotor coil;

a stator mounted to the case so as to cover an outer circumferential side of the rotor, the stator being provided with a stator winding in which an electromotive force is generated by the rotating magnetic field generated by the rotor;

a pair of electric current supplying members disposed so as to be separated in an axial direction on a first end portion of the shaft projecting out of the case and be able to rotate together with the shaft, the pair of electric current supplying members being electrically connected in series by means of the rotor coil; and a brush holding apparatus removably disposed on an outer end surface of the case so as to be positioned radially outside the pair of electric current supplying members, wherein: the brush holding apparatus is provided with:

a brush holder portion in which a pair of brush insertion apertures is formed such that an aperture direction of each of the brush insertion apertures is perpendicular to a center axis of the shaft, the pair of brush insertion apertures being separated in an axial direction of the shaft;

a cap removably mounted to a head portion of the brush holder portion for covering the pair of brush insertion apertures;

a pair of brushes each housed inside the pair of brush insertion apertures so as to be able to move freely in the aperture direction;

a pair of brush terminals constituting input and output terminals of the brushes; a pair of lead wires each having a first end linked to a first end portion of the brushes and a second end linked to the brush terminals; electrically-conductive elastic members disposed inside each of the brush insertion apertures for placing a second end of each of the brushes in elastic contact with the electric current supplying members by forcing the brushes toward the shaft; and an abrasion detection terminal disposed in at least one of the pair of brush insertion apertures, the abrasion detection terminal being provided with a contact for contacting at least one of the elastic members when the brushes are abraded by a predetermined amount; and a cover is removably mounted to an outer wall surface of the case from an axial direction of the shaft so as to envelop the brush holding apparatus, thereby providing an automotive alternator enabling brush abrasion to be detected before the occurrence of defective power generation or defective charging of the battery, and in addition, enabling brush replacement without dismantling the alternator.

Each of the elastic members may be constituted by a coil spring, the elastic force of the coil spring acting stably on the brush, thereby suppressing asymmetrical wearing of the brush.

The coil spring may be disposed in a compressed state between the brush and the brush terminal, integrating the brush, the brush terminal, the coil spring, etc., thereby improving brush replacement.

The brushes may be formed into a substantially rectangular parallelepiped in which a cross section perpendicular to a longitudinal direction is a rectangular shape, the coil spring may be formed into a cylindrical shape, the brush and the coil spring may be disposed such that a center of the rectangular shape of the brush and a center of the cylindrical shape of the coil spring are substantially aligned, and a relationship between a length of a short side (E) and a length of a long side (F) of the rectangular shape and an outside diameter (D) of the coil spring may satisfy an expression $E<D<F$, eliminating contact between the contact and the brush, thereby preventing false detection of brush abrasion.

The brush insertion aperture may be formed with an aperture shape having an internal shape substantially matching a composite external shape formed by superposing the cylindrical shape of the coil spring onto the rectangular shape of the brush in a longitudinal direction of the brush, enabling the brush and the coil spring to be guided by the brush insertion aperture and move smoothly, thereby preventing misalignment of the brush and the coil spring as a result of external vibration.

The lead wire may be linked to a central portion of a first end surface of the brush, and a flexible tube may be mounted to the lead wire, suppressing entanglement between the lead wire and the elastic member, thereby suppressing the occurrence of snapping of the lead wire.

According to another aspect of the present invention, there is provided an automotive alternator brush abrasion detection system including: an automotive alternator provided with: a case; a shaft rotatably supported in the case; a rotor fixed to the shaft and disposed inside the case for generating a rotating magnetic field, the rotor being provided with:
a rotor coil in which a magnetic flux is generated on passage of an electric current; and
a plurality of magnetic poles magnetized by the magnetic flux generated in the rotor coil;
a stator mounted to the case so as to cover an outer circumferential side of the rotor,
the stator being provided with a stator winding in which an electromotive force is generated by the rotating magnetic field generated by the rotor;
a pair of electric current supplying members disposed so as to be separated in an axial direction on a first end portion of the shaft and be able to rotate together with the shaft, the pair of electric current supplying members being electrically connected in series by means of the rotor coil;
a brush holding apparatus disposed inside the case so as to be positioned radially outside the pair of electric current supplying members;
a rectifier disposed inside the case for rectifying and outputting the electromotive force from the stator winding; and
a voltage regulator disposed inside the case for adjusting a magnitude of the electromotive force in the stator winding,
wherein the brush holding apparatus being provided with:
a brush holder portion in which a pair of brush insertion apertures is formed such that an aperture direction of each of the brush insertion apertures is perpendicular to a center axis of the shaft, the pair of brush insertion apertures being separated in an axial direction of the shaft;
a cap removably mounted to a head portion of the brush holder portion for covering the pair of brush insertion apertures; a pair of brushes each housed inside the pair of brush insertion apertures so as to be able to move freely in the aperture direction; a pair of brush terminals constituting input and output terminals of the brushes;
a pair of lead wires each having a first end linked to a first end portion of the brushes and a second end linked to the brush terminals;
electrically-conductive elastic members disposed inside each of the brush insertion apertures for placing a second end of each of the brushes in elastic contact with the electric current supplying members by forcing the brushes toward the shaft; and
an abrasion detection terminal disposed in at least one of the pair of brush insertion apertures, the abrasion detection terminal being provided with a contact for contacting at least one of the elastic members when the brushes are abraded by a predetermined amount, and
an opening being disposed in the case radially outside the brush holder portion so as to expose the cap; and
a first lamp for announcing abrasion of the brushes by contact between the elastic member and the contact,
thereby providing an automotive alternator brush abrasion detection system enabling a driver to be made aware of brush abrasion by means of the first lamp and replace the brushes before the occurrence of defective power generation or defective charging of the battery, and enabling the amount of time before recommencing operation of the vehicle to be shortened by making brush replacement possible without dismantling the alternator.

According to another aspect of the present invention, there is provided an automotive alternator brush abrasion detection system including:

an automotive alternator provided with: a case; a shaft rotatably supported in the case;
a rotor fixed to the shaft and disposed inside the case for generating a rotating magnetic field, the rotor being provided with:
a rotor coil in which a magnetic flux is generated on passage of an electric current; and
a plurality of magnetic poles magnetized by the magnetic flux generated in the rotor coil; a stator mounted to the case so as to cover an outer circumferential side of the rotor, the stator being provided with a stator winding in which an electromotive force is generated by the rotating magnetic field generated by the rotor;
a pair of electric current supplying members disposed so as to be separated in an axial direction on a first end portion of the shaft projecting out of the case and be able to rotate together with the shaft, the pair of electric current supplying members being electrically connected in series by means of the rotor coil;
a brush holding apparatus removably disposed on an outer end surface of the case so as to be positioned radially outside the pair of electric current supplying members;
a rectifier for rectifying and outputting the electromotive force from the stator winding;
and a voltage regulator for adjusting a magnitude of the electromotive force in the stator winding,
wherein the brush holding apparatus being provided with:
a brush holder portion in which a pair of brush insertion apertures is formed such that an aperture direction of each of the brush insertion apertures is perpendicular to a center axis of the shaft, the pair of brush insertion apertures being separated in an axial direction of the shaft;
a cap removably mounted to a head portion of the brush holder portion for covering the pair of brush insertion apertures;
a pair of brushes each housed inside the pair of brush insertion apertures so as to be able to move freely in the aperture direction;
a pair of brush terminals constituting input and output terminals of the brushes;
a pair of lead wires each having a first end linked to a first end portion of the brushes and a second end linked to the brush terminals;
electrically-conductive elastic members disposed inside each of the brush insertion apertures for placing a second end of each of the brushes in elastic contact with the electric current supplying members by forcing the brushes toward the shaft; and
an abrasion detection terminal disposed in at least one of the pair of brush insertion apertures, the abrasion detection terminal being provided with a contact for contacting at least one of the elastic members when the brushes are abraded by a predetermined amount, and
a cover being removably mounted to an outer wall surface of the case from an axial direction of the shaft so as to envelop the brush holding apparatus; and a first lamp for announcing abrasion of the brushes by contact between the elastic member and the contact,
thereby providing an automotive alternator brush abrasion detection system enabling a driver to be made aware of brush abrasion by means of the first lamp and replace the brushes before the occurrence of defective power generation or defective charging of the battery, and enabling the amount of time before recommencing operation of the vehicle to be shortened by making brush replacement possible without dismantling the alternator.

A resistance value of an electric current path in which a portion of the electric current flowing through the rotor coil is diverted to flow through the contact during contact between the elastic member and the contact may be equal to or greater than five times a resistance value of the rotor coil, enabling the occurrence of sparks or arcing to be prevented when the contact closes, thereby enabling suppression of damage to the contact.

There may be further provided:
a first control portion for detecting an absence of power generation in the automotive alternator by monitoring a phase voltage of the stator winding;
a second control portion for detecting an overvoltage in the automotive alternator by monitoring output from the rectifier; and
a third control portion for detecting abrasion of the brushes by monitoring a portion of the electric current flowing through the rotor coil which is diverted to flow through the contact, wherein the absence of power generation or the overvoltage in the automotive alternator is announced by switching the first lamp on when the first control portion detects the absence of power generation or the second control portion detects the overvoltage in the automotive alternator, and
abrasion of the brushes is announced by flashing the first lamp on and off when the third control portion detects the abrasion of the brushes,
enabling detection of absences of power generation, overvoltages, and brush abrasion in the automotive alternator to be announced by a single lamp, thereby enabling simplification of the vehicle wiring harness.

The abrasion of the brushes may be announced by flashing the first lamp on and off only when the first control portion does not detect the absence of power generation in the automotive alternator, the second control portion does not detect the overvoltage in the automotive alternator, and the third control portion detects the abrasion of the brushes, whereby the first lamp does not flash on and off when the key switch is turned on. Thus, it is possible to confirm that the first lamp is functioning normally when the key switch is turned on by the first lamp being switched on.

The abrasion of the brushes may be announced by flashing the first lamp on and off only when the first control portion detects the absence of power generation in the automotive alternator and the third control portion detects the abrasion of the brushes, whereby the driver is not startled by the first lamp flashing on and off suddenly when the vehicle is operating.

The first, second, and third control portions may be incorporated into the voltage regulator, facilitating the configuration of the electrical circuit, thereby enabling reductions in size.

There may be further provided: a first control portion for detecting an absence of power generation in the automotive alternator by monitoring a phase voltage of the stator winding; a second control portion for detecting an overvoltage in the automotive alternator by monitoring output from the rectifier; and
a second lamp for announcing the absence of power generation or the overvoltage in the automotive alternator,
wherein the absence of power generation or the overvoltage in the automotive alternator is announced by switching the second lamp on when the first control portion detects the absence of power generation or the second control portion detects the overvoltage in the automotive alternator, and the abrasion of the brushes is announced by switching the first lamp on by diverting to the first lamp a portion of the electric current flowing through the rotor coil when the contact contacts the elastic member, enabling absences of power generation and overvoltages, and detection of brush abrasion to be announced by switching on separate lamps, facilitating identification by the driver.

There may be further provided: a first control portion for detecting an absence of power generation in the automotive alternator by monitoring a phase voltage of the stator winding;
a second control portion for detecting an overvoltage in the automotive alternator by monitoring output from the rectifier, a third control portion for detecting abrasion of the brushes by monitoring a portion of the electric current flowing through the rotor coil which is diverted to flow through the contact; and
a second lamp for announcing the absence of power generation or the overvoltage in the automotive alternator,
wherein the absence of power generation or the overvoltage in the automotive alternator is announced by switching the second lamp on when the first control portion detects the absence of power generation or the second control portion detects the overvoltage in the automotive alternator, and
the abrasion of the brushes is announced by switching the first lamp on when the third control portion detects the abrasion of the brushes,
enabling absences of power generation and overvoltages, and detection of brush abrasion to be announced by switching on separate lamps, facilitating identification by the driver.

An external controlling means of the automotive alternator may control switching between switching on of the second lamp and switching on of the first lamp based on a detection signal from the first and second control portions indicating the absence of power generation or the overvoltage, and a detection signal from the third control portion indicating the abrasion of the brushes, enabling absences of power generation and overvoltages, and detection of brush abrasion to be announced by switching on separate lamps, facilitating identification by the driver.

What is claimed is:
1. An automotive alternator brush abrasion detection system comprising:
an automotive alternator provided with:
a case;
a shaft rotatably supported in said case;
a rotor fixed to said shaft and disposed inside said case for generating a rotating magnetic field, said rotor being provided with:
a rotor coil in which a magnetic flux is generated on passage of an electric current; and
a plurality of magnetic poles magnetized by said magnetic flux generated in said rotor coil;
a stator mounted to said case so as to cover an outer circumferential side of said rotor, said stator being provided with a stator winding in which an electromotive force is generated by said rotating magnetic field generated by said rotor;
a pair of electric current supplying members disposed so as to be separated in an axial direction on a first end portion of said shaft and be able to rotate together with said shaft, said pair of electric current supplying members being electrically connected in series by means of said rotor coil;

a brush holding apparatus disposed inside said case so as to be positioned radially outside said pair of electric current supplying members;
a rectifier disposed inside said case for rectifying and outputting said electromotive force from said stator winding; and
a voltage regulator disposed inside said case for adjusting a magnitude of said electromotive force in said stator winding,
  wherein said brush holding apparatus comprises:
  a brush holder portion in which a pair of brush insertion apertures is formed such that an aperture direction of each of said brush insertion apertures is perpendicular to a center axis of said shaft, said pair of brush insertion apertures being separated in an axial direction of said shaft;
  a cap removably mounted to a head portion of said brush holder portion for covering said pair of brush insertion apertures;
  a pair of brushes each housed inside said pair of brush insertion apertures so as to be able to move freely in said aperture direction;
  a pair of brush terminals constituting input and output terminals of said brushes;
  a pair of lead wires each having a first end linked to a first end portion of said brushes and a second end linked to said brush terminals;
  electrically-conductive elastic members disposed inside each of said brush insertion apertures for placing a second end of each of said brushes in elastic contact with said electric current supplying members by forcing said brushes toward said shaft;
  an abrasion detection terminal disposed in at least one of said pair of brush insertion apertures, said abrasion detection terminal being provided with a contact for contacting at least one of said elastic members when said brushes are abraded by a predetermined amount, and
  an opening is disposed in said case radially outside said brush holder portion so as to expose said cap; and
  a first lamp for announcing abrasion of said brushes by contact between said elastic member and said contact,
wherein a resistance value of an electric current path in which a portion of said electric current flowing through said rotor coil is diverted to flow through said contact during contact between said elastic member and said contact is equal to or greater than five times a resistance value of said rotor coil.

2. An automotive alternator brush abrasion detection system comprising:
an automotive alternator provided with:
a case;
a shaft rotatably supported in said case;
a rotor fixed to said shaft and disposed inside said case for generating a rotating magnetic field, said rotor being provided with;
a rotor coil in which a magnetic flux is generated on passage of an electric current; and
a plurality of magnetic poles magnetized by said magnetic flux generated in said rotor coil;
a stator mounted to said case so as to cover an outer circumferential side of said rotor, said stator being provided with a stator winding in which an electromotive force is generated by said rotating magnetic field generated by said rotor;
a pair of electric current supplying members disposed so as to be separated in an axial direction on a first end portion of said shaft and be able to rotate together with said shaft, said pair of electric current supplying members being electrically connected in series by means of said rotor coil;
a brush holding apparatus disposed inside said case so as to be positioned radially outside said pair of electric current supplying members;
a rectifier disposed inside said case for rectifying and outputting said electromotive force from said stator winding;
a voltage regulator disposed inside said case for adjusting a magnitude of said electromotive force in said stator winding,
  wherein said brush holding apparatus being provided with:
  a brush holder portion in which a pair of brush insertion apertures is formed such that an aperture direction of each of said brush insertion apertures is perpendicular to a center axis of said shaft, said pair of brush insertion apertures being separated in an axial direction of said shaft;
  a cap removably mounted to a head portion of said brush holder portion for covering said pair of brush insertion apertures;
  a pair of brushes each housed inside said pair of brush insertion apertures so as to be able to move freely in said aperture direction;
  a pair of brush terminals constituting input and output terminals of said brushes;
a pair of lead wires each having a first end linked to a first end portion of said brushes and a second end linked to said brush terminals;
  electrically-conductive elastic members disposed inside each of said brush insertion apertures for placing a second end of each of said brushes in elastic contact with said electric current supplying members by forcing said brushes toward said shaft; and
  an abrasion detection terminal disposed in at least one of said pair of brush insertion apertures, said abrasion detection terminal being provided with a contact for contacting at least one of said elastic members when said brushes are abraded by a predetermined amount, and
  an opening is disposed in said case radially outside said brush holder portion so as to expose said cap; and
  a first lamp for announcing abrasion of said brushes by contact between said elastic member and said contact; and
a first control portion for detecting an absence of power generation in said automotive alternator by monitoring a phase voltage of said stator winding;
a second control portion for detecting an overvoltage in said automotive alternator by monitoring output from said rectifier; and
a third control portion for detecting abrasion of said brushes by monitoring a portion of said electric current flowing through said rotor coil which is diverted to flow through said contact,
wherein said absence of power generation or said overvoltage in said automotive alternator is announced by switching said first lamp on when said first control portion detects said absence of power generation or said second control portion detects said overvoltage in said automotive alternator, and said abrasion of said brushes is announced by flashing said first lamp on and off when said third control portion detects said abrasion of said brushes.

3. The automotive alternator brush abrasion detection system according to claim 2, wherein:
said abrasion of said brushes is announced by flashing said first lamp on and off only when said first control portion does not detect said absence of power generation in said automotive alternator, said second control portion does not detect said overvoltage in said automotive alternator, and said third control portion detects said abrasion of said brushes.

4. The automotive alternator brush abrasion detection system according to claim 2, wherein:
said abrasion of said brushes is announced by flashing said first lamp on and off only when said first control portion detects said absence of power generation in said automotive alternator and said third control portion detects said abrasion of said brushes.

5. The automotive alternator brush abrasion detection system according to claim 2, wherein:
said first, second, and third control portions is incorporated into said voltage regulator.

6. An automotive alternator brush abrasion detection system comprising:
an automotive alternator provided with:
a case;
a shaft rotatably supported in said case;
a rotor fixed to said shaft and disposed inside said case for generating a rotating magnetic field, said rotor being provided with:
a rotor coil in which a magnetic flux is generated on passage of an electric current; and
a plurality of magnetic poles magnetized by said magnetic flux generated in said rotor coil;
a stator mounted to said case so as to cover an outer circumferential side of said rotor, said stator being provided with a stator winding in which an electromotive force is generated by said rotating magnetic field generated by said rotor;
a pair of electric current supplying members disposed so as to be separated in an axial direction on a first end portion of said shaft and be able to rotate together with said shaft, said pair of electric current supplying members being electrically connected in series by means of said rotor coil;
a brush holding apparatus disposed inside said case so as to be positioned radially outside said pair of electric current supplying members;
a rectifier disposed inside said case for rectifying and outputting said electromotive force from said stator winding;
a voltage regulator disposed inside said case for adjusting a magnitude of said electromotive force in said stator winding,
wherein said brush holding apparatus being provided with:
a brush holder portion in which a pair of brush insertion apertures is formed such that an aperture direction of each of said brush insertion apertures is perpendicular to a center axis of said shaft, said pair of brush insertion apertures being separated in an axial direction of said shaft;
a cap removably mounted to a head portion of said brush holder portion for covering said pair of brush insertion apertures;
a pair of brushes each housed inside said pair of brush insertion apertures so as to be able to move freely in said aperture direction;
a pair of brush terminals constituting input and output terminals of said brushes;
a pair of lead wires each having a first end linked to a first end portion of said brushes and a second end linked to said brush terminals;
electrically-conductive elastic members disposed inside each of said brush insertion apertures for placing a second end of each of said brushes in elastic contact with said electric current supplying members by forcing said brushes toward said shaft; and
an abrasion detection terminal disposed in at least one of said pair of brush insertion apertures, said abrasion detection terminal being provided with a contact for contacting at least one of said elastic members when said brushes are abraded by a predetermined amount, and
an opening is disposed in said case radially outside said brush holder portion so as to expose said cap; and
a first lamp for announcing abrasion of said brushes by contact between said elastic member and said contact; and
a first control portion for detecting an absence of power generation in said automotive alternator by monitoring a phase voltage of said stator winding;
a second control portion for detecting an overvoltage in said automotive alternator by monitoring output from said rectifier; and
a second lamp for announcing said absence of power generation or said overvoltage in said automotive alternator,
wherein said absence of power generation or said overvoltage in said automotive alternator is announced by switching said second lamp on when said first control portion detects said absence of power generation or said second control portion detects said overvoltage in said automotive alternator, and
said abrasion of said brushes is announced by switching said first lamp on by diverting to said first lamp a portion of said electric current flowing through said rotor coil when said contact contacts said elastic member.

7. An automotive alternator brush abrasion detection system comprising:
an automotive alternator provided with:
a case;
a shaft rotatably supported in said case;
a rotor fixed to said shaft and disposed inside said case for generating a rotating magnetic field, said rotor being provided with:
a rotor coil in which a magnetic flux is generated on passage of an electric current; and
a plurality of magnetic poles magnetized by said magnetic flux generated in said rotor coil;
a stator mounted to said case so as to cover an outer circumferential side of said rotor, said stator being provided with a stator winding in which an electromotive force is generated by said rotating magnetic field generated by said rotor;
a pair of electric current supplying members disposed so as to be separated in an axial direction on a first end portion of said shaft and be able to rotate together with said shaft, said pair of electric current supplying members being electrically connected in series by means of said rotor coil;

a brush holding apparatus disposed inside said case so as to be positioned radially outside said pair of electric current supplying members;

a rectifier disposed inside said case for rectifying and outputting said electromotive force from said stator winding;

a voltage regulator disposed inside said case for adjusting a magnitude of said electromotive force in said stator winding, wherein said brush holding apparatus being provided with:

a brush holder portion in which a pair of brush insertion apertures is formed such that an aperture direction of each of said brush insertion apertures is perpendicular to a center axis of said shaft, said pair of brush insertion apertures being separated in an axial direction of said shaft;

a cap removably mounted to a head portion of said brush holder portion for covering said pair of brush insertion apertures;

a pair of brushes each housed inside said pair of brush insertion apertures so as to be able to move freely in said aperture direction;

a pair of brush terminals constituting input and output terminals of said brushes;

a pair of lead wires each having a first end linked to a first end portion of said brushes and a second end linked to said brush terminals;

electrically-conductive elastic members disposed inside each of said brush insertion apertures for placing a second end of each of said brushes in elastic contact with said electric current supplying members by forcing said brushes toward said shaft; and an abrasion detection terminal disposed in at least one of said pair of brush insertion apertures, said abrasion detection terminal being provided with a contact for contacting at least one of said elastic members when said brushes are abraded by a predetermined amount, and an opening is disposed in said case radially outside said brush holder portion so as to expose said cap; and a first lamp for announcing abrasion of said brushes by contact between said elastic member and said contact; and a first control portion for detecting an absence of power generation in said automotive alternator by monitoring a phase voltage of said stator winding;

a second control portion for detecting an overvoltage in said automotive alternator by monitoring output from said rectifier, a third control portion for detecting abrasion of said brushes by monitoring a portion of said electric current flowing through said rotor coil which is diverted to flow through said contact; and a second lamp for announcing said absence of power generation or said overvoltage in said automotive alternator, wherein said absence of power generation or said overvoltage in said automotive alternator is announced by switching said second lamp on when said first control portion detects said absence of power generation or said second control portion detects said overvoltage in said automotive alternator, and said abrasion of said brushes is announced by switching said first lamp on when said third control portion detects said abrasion of said brushes.

8. The automotive alternator brush abrasion detection system according to claim 7, wherein:

an external controlling means of said automotive alternator controls switching between switching on of said second lamp and switching on of said first lamp based on a detection signal from said first and second control portions indicating said absence of power generation or said overvoltage and a detection signal from said third control portion indicating said abrasion of said brushes.

* * * * *